(12) United States Patent
Kawato et al.

(10) Patent No.: US 7,089,868 B2
(45) Date of Patent: Aug. 15, 2006

(54) CONVEYANCE APPARATUS USING MOVABLE BODY

(75) Inventors: Kenichiro Kawato, Shiga (JP); Shigeyoshi Nishihara, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 11/117,633

(22) Filed: Apr. 19, 2005

(65) Prior Publication Data

US 2005/0183620 A1 Aug. 25, 2005

Related U.S. Application Data

(62) Division of application No. 10/601,447, filed on Jun. 23, 2003, now abandoned.

(30) Foreign Application Priority Data

Jun. 21, 2002 (JP) .............................. 2002-180643

(51) Int. Cl.
*B61B 3/02* (2006.01)
(52) U.S. Cl. ...................... 104/103; 104/172.4; 104/96
(58) Field of Classification Search ................ 104/168, 104/172.4, 35, 45, 27, 29, 96, 99, 103
See application file for complete search history.

(56) References Cited

FOREIGN PATENT DOCUMENTS

| JP | 49-45269 | 4/1974 |
|---|---|---|
| JP | 49-107081 | 9/1974 |
| JP | 49-107082 | 9/1974 |
| JP | 57-41249 | 3/1982 |
| JP | 7-108928 A | 4/1995 |
| JP | 2001-114094 | 10/1999 |

*Primary Examiner*—Mark T. Le
(74) *Attorney, Agent, or Firm*—D. Peter Hochberg; Sean Mellino; Katherine R. Vieyra

(57) ABSTRACT

A conveyance apparatus using movable bodies, in which a plurality of lateral travel rail members capable of supporting and guiding guided devices situated on a main rail are provided to the side of a prescribed region of the fixed path, in such a manner that a frame member provided with a supporting section assumes an orthogonal attitude or position with respect to a direction of travel, and the other frame members become aligned in the direction of travel, and causing the guided devices to branch off onto the lateral travel rail member group in the prescribed region. Thereby, spacing between the movable bodies in the lateral travel direction can be maintained readily by using a simple structure, and the group of movable bodies can be moved laterally in such a manner that there is no mutual contact between conveyed items.

3 Claims, 28 Drawing Sheets

CONVEYANCE APPARATUS USING MOVABLE BODY

CROSS REFERENCE TO RELATED APPLICATIONS

This application is a divisional application of application Ser. No. 10/601,447, filed Jun. 23, 2003, now abandoned.

BACKGROUND OF THE INVENTION

1. Field of the Invention

The present invention relates to a conveyance apparatus using movable bodies, which is used to move a movable body for conveying items on a fixed path located on a floor or on a ceiling, for example.

2. Background Art

Conventionally, a conveyance apparatus using movable bodies disclosed in Japanese Unexamined Patent Publication No. 2001-114094, for example, has been used as this kind of apparatus. More specifically, the main body of a movable body which is able to move along a fixed path by being supported and guided on rails by means of a plurality of guided devices, is formed by three frame members which are connected, by means of a connecting device, in a relatively rotatable fashion in lateral directions traversing the longitudinal travelling direction of the movable body. A supporting section for items to be conveyed is provided on the middle frame, and a group of guided devices are connected, by means of a vertical axle, to the movable body in a relatively rotatable fashion. A plurality of divided rail members capable of supporting the group of guided devices are provided in a set path section within the fixed path, and furthermore, rotating means for causing these divided rail members to rotate about a vertical axis are also provided. Moreover, a group of lateral travel rail members capable of connecting to the divided rail members when the latter are rotated and separated from the rails, are provided to the lateral side of the set path section.

According to this conventional constitution, the respective guided devices of the movable body are supported on the divided rail members, and in this state, the group of divided rail members are connected to the lateral travel rail members by reverse rotation of rotating means. Thereby, the respective guided devices can assume a posture facing sideways in the lateral direction, whilst the main body of the movable body is aligned in a direction following the set path section. By moving the group of guided devices sideways in a lateral direction, the movable body can be moved laterally whilst the main body of the movable body remains in an attitude aligned with the set path section. Consequently, by forming a storage path from a lateral travel path section composed of a group of lateral travel rail members, it is possible to store the movable bodies in such a manner that the main bodies thereof are aligned laterally in parallel.

However, according to the prior art constitution described above, in the lateral travel path section, it is not readily possible to maintain a spacing between movable bodies in the lateral travel direction, and therefore, in order to convey the movable bodies laterally in such a manner that there is no mutual contact between the conveyed items, it has been necessary to separately install lateral conveyance devices, or the like, having a complicated structure.

DISCLOSURE OF THE INVENTION

Therefore, it is an object of the present invention to provide a conveyance apparatus using movable bodies, whereby spacing between movable bodies in the lateral direction can be maintained readily by means of a simple structure, and hence a group of movable bodies can be conveyed in a lateral direction, in such a manner that there is no mutual contact between conveyed items.

In order to achieve the object, the conveyance apparatus using movable bodies according to the present invention is a conveyance apparatus using movable bodies in which each movable body is able to move along a fixed path by being supported and guided on a main rail by means of a plurality of guided devices, the main body of the movable body being formed by a plurality of frame members connected in a relatively rotatable fashion in a traverse direction with respect to a longitudinal direction via connecting devices, at least one of the frame members being provided with a supporting section for conveyed items, each of the guided devices being coupled in a relatively rotatable fashion to the movable body by means of vertical axles, characterized in that a plurality of lateral travel rail members are provided on a lateral side of a prescribed region of the fixed path for supporting and guiding the guided devices in such a manner that the frame member provided with the supporting section assumes an orthogonal position with respect to a direction of travel, whilst the other frame members become aligned with the direction of travel, and branching means is provided in the prescribed region for causing the guided devices on the main rail to branch off onto the plurality of lateral travel rail members.

By adopting the foregoing constitution, in linear shaped path sections of the fixed path, the movable body can be moved in such a manner that the main body thereof, in other words, the respective frame members thereof, assume a linear attitude in a plan view. Moreover, in a left or right-hand curved path section, the movable body can be moved in such a manner that the respective frame members thereof assume a curved attitude in accordance with the curved path, also in a plan view, by means of the connecting devices, and in this case, such curvature is achieved by relative rotation of the guided devices about vertical axles. Furthermore, by means of the guided devices rotating about the vertical axles, the movable body can be conveyed smoothly by automatically adjusting the orientation thereof in accordance with the leftward or rightward curvature of the rail.

In this way, by causing the respective guided devices of a movable body to branch off from the main rail and onto lateral travel rail members when the movable body arrives at the prescribed region of the fixed path by being supported and guided on the main rail, it is possible to branch off and convey the movable body in a lateral direction with respect to the fixed path, in a state where the frame member provided with the supporting section is positioned orthogonally with respect to the direction of travel and the other frame members are aligned in the direction of travel. Thereby, it is possible to move movable bodies laterally in a state where a spacing corresponding to the length of the other frame members is maintained therebetween in the lateral travel direction, and this maintenance of the spacing between movable bodies in the lateral travel direction is achieved readily by means of a simple structure, and hence a group of movable bodies can be conveyed laterally in such a manner that there is no mutual contact between conveyed items.

A conveyance apparatus using movable bodies according to a first aspect of the present invention is such that the main body of the movable body is formed by three frame members, the supporting section being provided on the middle frame member, and a pair of lateral travel rail members are provided in such a manner that the movable body is conveyed laterally in a state wherein the front frame member thereof is aligned with one of the lateral travel rail members, and the rear frame member thereof is bent to be aligned with the other lateral travel rail member.

According to this first aspect, it is possible to branch off and convey a movable body in a lateral direction with respect to the fixed path, in a state where the middle frame member provided with the supporting section assumes an orthogonal position with respect to the direction of travel, whilst the front frame member and rear frame member are bent so as to be aligned with the lateral travel rail members. Thereby, movable bodies can be moved in a lateral direction in a state where a spacing corresponding to the length of the front frame member and the rear frame member is guaranteed therebetween in the lateral travel direction.

A conveyance apparatus using movable bodies according to a second aspect of the present invention is such that when a plurality of movable bodies are supported and guided on the lateral travel rail members, guided devices of preceding and following movable bodies which are adjacently positioned in the direction of travel can be coupled together.

According to this second aspect, by coupling the guided devices of a movable body which is branched off and conveyed laterally, with the guided devices of the preceding movable body, it is possible thereafter to move a group of movable bodies laterally, in a train-like fashion.

A conveyance apparatus using movable bodies according to a third aspect of the present invention is such that motional force applying means is provided for applying motional force to a movable body supported on the plurality of lateral travel rail members.

According to this third aspect, it is possible to convey a movable body that has been branched off, in an state wherein the frame member provided with the supporting section can move orthogonally to the direction of travel, by the operation of the motional force applying means.

A conveyance apparatus using movable bodies according to a fourth aspect of the present invention is such that the region where the lateral travel rail members are provided is formed into a working path section with respect to conveyed items.

According to this fourth aspect, it is possible to maintain spacing between movable bodies in the lateral travel direction, and hence various tasks can be performed readily and accurately with respect to the conveyed items, whilst a group of movable bodies are conveyed laterally in such a manner that there is no mutual contact between the conveyed items.

A conveyance apparatus using movable bodies according to a fifth aspect of the present invention is such that the movable body is formed with passive surfaces on the side faces of the respective frame members thereof, and feeding means having feed rollers capable of abutting on these passive surfaces is provided in the fixed path.

According to this fifth aspect, by causing forcibly rotated feed rollers to abut on the passive surfaces of the movable body, it is possible to impart a motional force (travelling force) to the movable body by means of rotational feeding force thereof, and hence the movable body can be conveyed readily and reliably.

A conveyance apparatus using movable bodies according to a sixth aspect of the present invention is such that the branching means comprises a plurality of divided rail members formed by dividing the main rail in the prescribed region and being capable of supporting the guided devices, and rotating devices for causing these divided rail members to rotate about vertical axes.

According to this sixth aspect, by causing the divided rail members to rotate about the vertical axles by operating the rotating devices so as to connect them to the main rail whilst separating them from the lateral travel rail members, it is possible to cause the guided devices of the conveyed movable body to be transferred from the main rail to the group of divided rail members, whereupon the movable object can be halted in a position wherein the guided devices are supported by corresponding divided rail members. Next, the divided rail members can be separated from the main rail and connected with the lateral travel rail members by reverse rotation of the rotating devices, and by means of this rotational force on the divided rail members, the guided devices can be rotated about vertical axles with respect to the main body or a supporting section of the movable body.

Consequently, by moving the guided devices by appropriate lateral feeding means, the guided devices can be transferred from the divided rail members onto the lateral travel rail members. Thereupon, by reverse operation of the rotating means, the divided rail members can be separated from the lateral travel rail members and connected with the main rail, thereby returning the system to the initial state. By an operation of this kind, it is possible to branch off a plurality of guided devices onto a plurality of divided rail members.

A conveyance apparatus using movable bodies according to a seventh aspect of the present invention is such that the branching means is composed in such a manner that all of the movable bodies arriving at the prescribed region in the fixed path are caused to branch off onto the plurality of lateral travel rail members.

According to this seventh aspect, a movable body arriving at the prescribed region is always transferred to the lateral travel rail members and conveyed laterally, without allowing it to pass through the prescribed region.

A conveyance apparatus using movable bodies according an eighth aspect of the present invention is such that the branching means is composed to branch off the movable body in such a manner that the frame members other than the frame member provided with the supporting section assume an orthogonal attitude in a same direction, with respect to the frame member provided with the supporting section.

According to this eighth aspect, the movable body can be conveyed laterally in a U-shaped bent attitude, wherein the other frame members are positioned mutually in parallel, in alignment with the lateral travel rail members, and hence a force for lateral conveyance, and the like, can be applied in a stable fashion by means of these other frame members in parallel alignment.

A conveyance apparatus using movable bodies according to a ninth aspect of the present invention is such that the movable body comprises a supporting section for conveyed items in a lower portion of at least one of the frame members.

According to this ninth aspect, it is possible to convey movable bodies of a suspended conveyance design, laterally, whilst the supporting section thereof retains a horizontal position.

PREFERRED EMBODIMENTS

Figure 1:
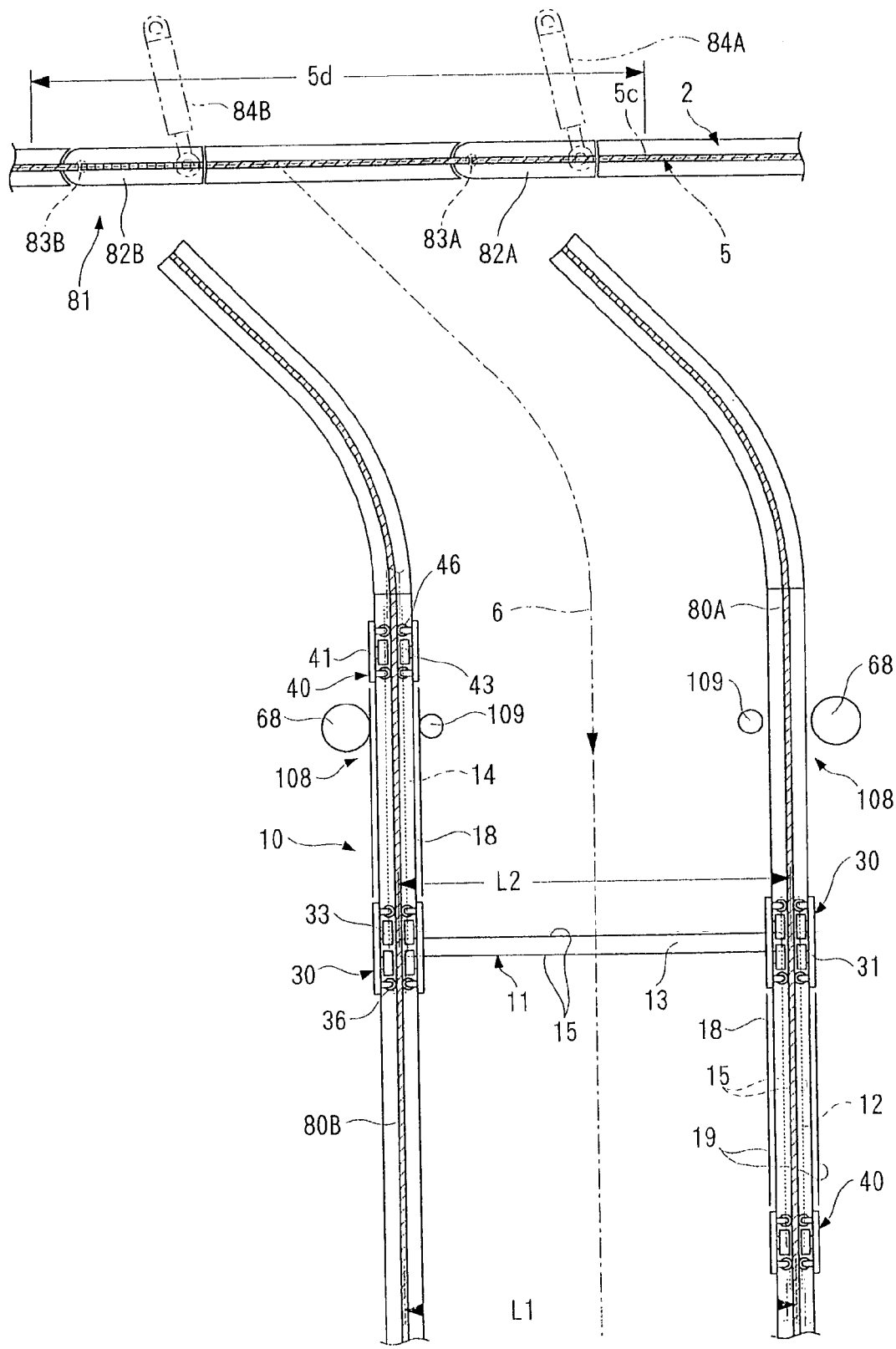
FIG. 1 is a partially cutaway plan view of a divided rail member section in a conveyance apparatus using movable bodies, before rotation, according to a first embodiment of the present invention.

A first embodiment of the present invention is described below in a mode applied to a ceiling-located travel system for movable bodies, with reference to FIG. 1–FIG. 20.

In FIG. 2 to FIG. 8, a main rail 2 having an I-shaped cross section is provided on a ceiling-mounted machine frame 1. This main rail 2 forms a fixed path 5. Here, the fixed path 5 comprises, in plan view, for example, a pair of parallel linear shaped path sections 5a, 5c, and a curved path section 5b which connects between the front and end portions of the linear shaped path sections 5a, 5c, and the like.

A portion of one of the pair of linear shaped path sections 5c is formed into a prescribed region 5d, and a working path section 6 is formed orthogonally on one side of this prescribed region 5d. Moreover, a separate fixed path 5A which is orthogonal to the working path section 6 and parallel to the linear path section 5c is similarly formed by a main rail 2A, or the like, having an I-shaped cross-section.

A movable body 10 is provided which is supported and guided by the main rail 2, 2A and is capable of moving along the fixed paths 5, 5A. The main body 11 of this movable body 10 is constituted by three (a plurality of) frame members 12, 13, 14. Here, the respective frame members 12, 13, 14 are formed from a square tubular member (square bar-shaped member) which extends in the direction of the fixed path 5, 5A, a front end member which is formed integrally with the front end of this square tubular member, and a rear end member which is formed integrally with the rear end thereof, and the like, the two side faces of the movable body 11 being formed into passive surfaces 15.

The front face and rear face of the movable body 11, in other words, the front face (free end section) of the front frame member 12, and the rear face (free end section) of the rear frame member 14 are formed into abutting sections 16, 17. Moreover, of the three frame members 12, 13, 14 forming the main body 11 of the movable body 10, a plate-shaped passive member 18 is provided in a standing fashion on the upper faces of the front frame member 12 and the rear frame member 14, and the respective side faces of these passive members 18 are formed into upper passive surfaces 19.

The front frame member 12 and the middle frame member 13, and the middle frame member 13 and the rear frame member 14, are respectively connected together by means of connecting devices 20, in such a manner that they are relatively rotatable in a crosswise direction and an upward and downward direction. Here, the respective connecting devices 20 are provided between the rear end member of the front frame member 12 and the front end member of the middle frame member 13, and between the rear end member of the middle frame member 13 and the front end member of the rear frame member 14.

In other words, a trunnion design is adopted for the connection devices 20, wherein a connecting member 22 connects in a relatively rotatable fashion in the crosswise direction with the front end member and rear end member of the middle frame member 13, via a vertical axle 21, and moreover, the connecting member 22 also connects in a relatively rotatable fashion in the upward and downward direction with the rear end member of the front frame member 12 and the front end member of the rear frame member 14 via a lateral axle 23. In this case, the vertical axle 21 is also constituted in such a manner that it can rotate relatively with respect to the middle frame member 13 or connecting member 22, about a vertical axis 21a.

The movable body 10 is constituted movably along the fixed path 5, 5A, by being supported and guided by the main rail 2, 2A via a plurality of guided devices. Here, the guided devices comprise a middle guided devices 30 connected to the vertical axle 21, and end guided devices 40 connected to a vertical axle 25 provided on the front end member of the front frame member 12 and the rear end member of the rear frame member 14, and these guided devices 30, 40 are composed in a similar trolley structure. The vertical axle 25 is composed in a relatively rotatable fashion (turnable fashion) with respect to the front frame member 12 or the rear frame member 14, about a vertical axis 25a.

More specifically, a trolley member 31 of the middle guided device 30 is constituted by a pair of supporting plate members 31a arranged on the left and right sides, and a pair of connecting plate members 31b fixed to the lower portion of these supporting plate members 31a on the front and rear sides. A pair of horizontal pins 32 consisting of front and rear horizontal pins are provided in the upper portion of each of the two supporting plate members 31a so as to project inwards and in alignment with each other, and supported rollers 33 which fit into the main rail 2, 2A and are supported and guided by same, are attached in a freely rotatable fashion on the inward projecting sections of the horizontal pins 32.

Furthermore, brackets 34 are provided on the inside of the upper portions of the two supporting plate members 31a, and to the outer sides, or front and rear sides of the locations where the horizontal pins 32 are provided, such that they are in alignment with each other, and vertical pins 35 extending downwards are fixed to these brackets 34. Guided rollers 36 which contact with the main rail 2, 2A and are guided by same are attached in a freely rotatable fashion to each of the vertical pins 35.

The middle guided device 30 is connected in a relatively rotatable fashion to the upper end portion of the vertical axle 21. In other words, the vertical axle 21 is inserted between the two supporting plate members 31a and between the two connecting plate members 31b, and a horizontal pin 24 which passes between the two supporting plate members 31a is inserted through the top end section of the vertical axle 21. In this way, the coupling between the upper end portion of the vertical axle 21 and the middle guided device 30 is achieved by means of the horizontal pin 24 which passes through the upper end portion of the vertical pin 21.

Furthermore, the end guided device 40 is generally similar to the middle guided device 30, the trolley member 41 thereof being constituted by a pair of supporting plates 41a disposed on the left and right sides, and a plurality of tubular spacer members 41c provided between the lower portions of these supporting plate members 41a by means of fixing devices (bolts and nuts) 41b. A single horizontal pin 42 is provided in the upper portion of each of the supporting plate members 41a so as to project inwards in alignment with each other, and supported rollers 43 which fit into the main rail 2, 2A and are supported and guided by same are provided in a freely rotatable fashion on the inward projection portions of the horizontal pins 42.

Brackets 44 are provided respectively on the inside of the upper portions of the two supporting plate members 41a, and on the outsides, or front and rear sides, of the locations where the horizontal pins 42 are provided so that they are in alignment with each other, and vertical pins 45 extending downwards are fixed respectively to these brackets 44. Guided rollers 46 which come into contact with the main rail 2, 2A and are guided by same are installed in a freely rotatable fashion on each of the vertical pins 45. Moreover, lift up prevention rollers 47 which oppose the main rail 2, 2A from the underside thereof are provided on a prescribed front and rear pair of the tubular spacer members 41c, in a freely rotatable fashion.

The end guided device 40 is connected in a relatively rotatable fashion to the upper end portion of the vertical axis 25. More specifically, the vertical axle 25 is inserted between the two supporting plate members 41a and between the lift up prevention rollers 47, and a horizontal pin 26 which passes between the two supporting plate members 41a is inserted through the upper end portion of the vertical axle 25. In this way, the coupling between the upper end portion of the vertical axle 25 and the end guided device 40 is achieved by means of the horizontal pin 26 which passes through the upper end portion of the vertical axle 25.

A supporting section 50 for conveyed items is provided on at least one of the three frame members 12, 13, 14 forming the main body 11 of the movable body 10, and more specifically, in a position below the middle frame member 13. This supporting section 50 comprises a longitudinal member 51 provided between the lower ends of the middle vertical axles 21, crosswise arm members 53 connected respectively via brackets 52 to the front and rear ends of the longitudinal member 51, and conveyed item supporting devices 54, or the like, provided on the free ends of the respective arm members 53. The longitudinal member 51 is composed in such a manner that it can rotate relatively about the vertical axis 21a, with respect to the vertical axle 21.

Figure 2:
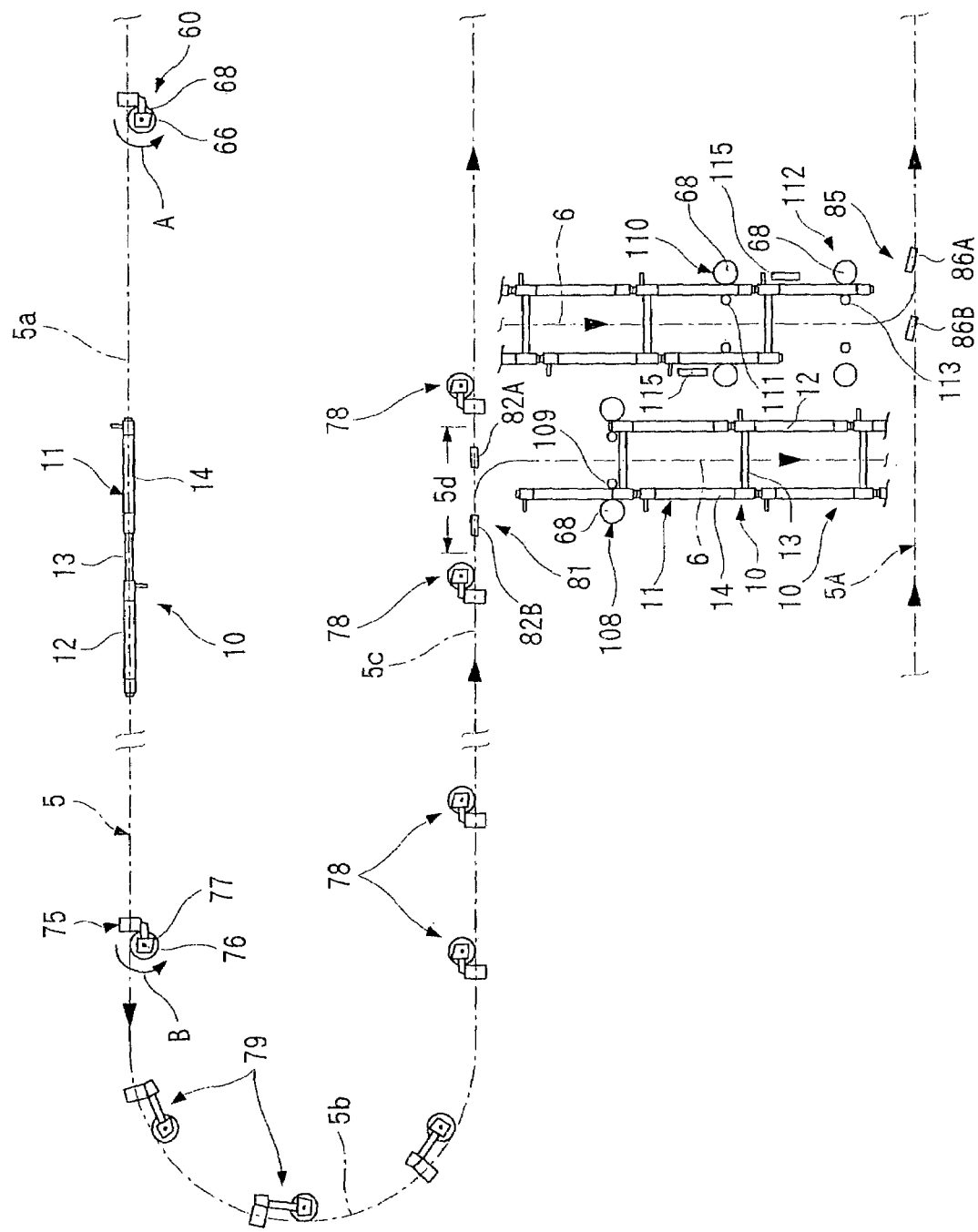
FIG. 2 is a schematic plan view of a fixed path section in the conveyance apparatus using movable bodies.
Figure 8:
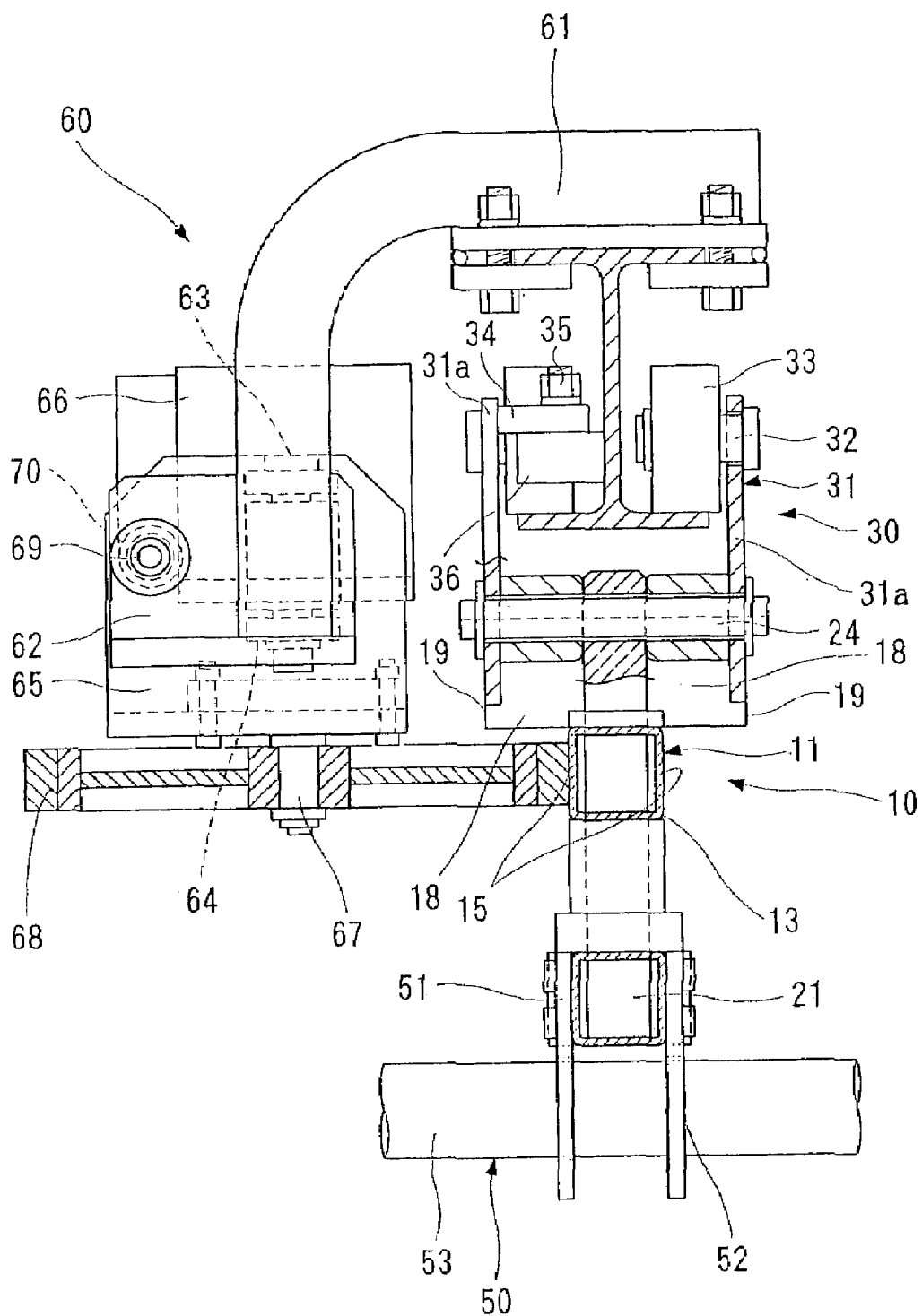
FIG. 8 is a partially cutaway rear view of the movable body in a feeding means section in the conveyance apparatus using movable bodies.
Figure 9:
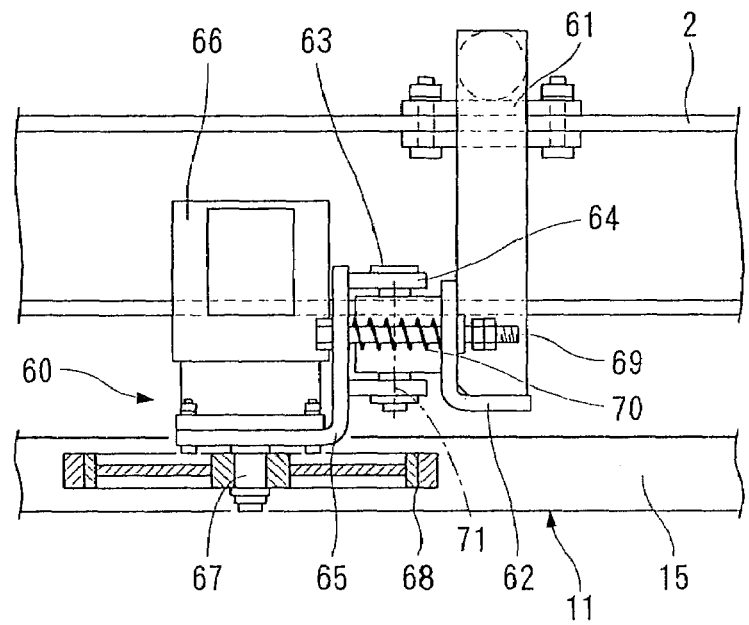
FIG. 9 is a partially cutaway side view of the feeding means section in the conveyance apparatus using movable bodies.
Figure 10:
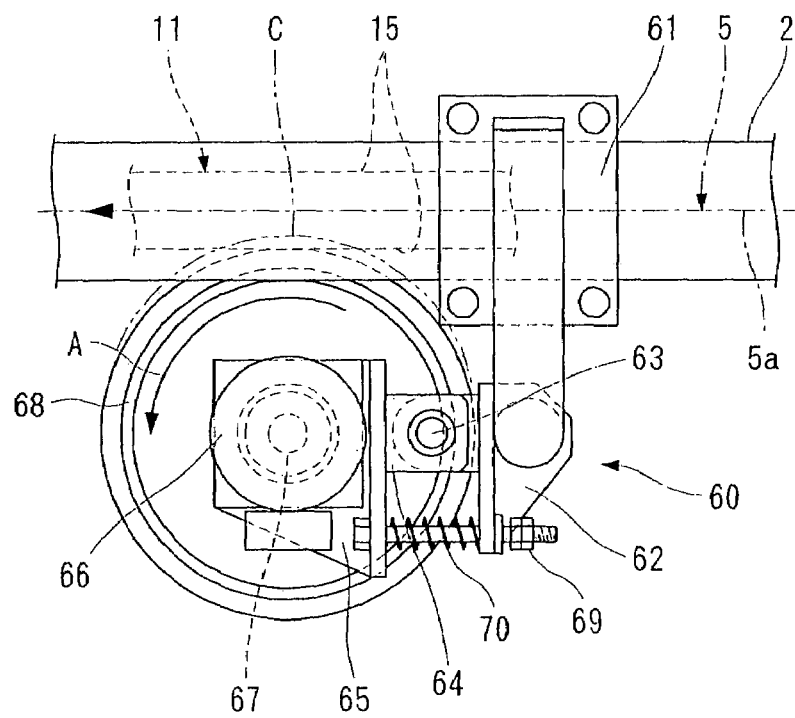
FIG. 10 is a plan view of the feeding means section in the conveyance apparatus using movable bodies.

In FIG. 2, feeding means 60 for applying a travelling force to the movable body 10 by acting on the passive surfaces 15 thereof are provided in the start end portion of the linear shaped path section 5a. As illustrated in FIG. 8 to FIG. 10, the base frame 61 of this feeding means 60 is attached to the upper face of the main rail 2, and a vertical axle 63 is supported rotatably on a bracket 62 installed on this base frame 61. A link member 64 is installed on the vertical axle 63, and a supporting member 65 is provided on the free end of this link member 64.

An induction motor 66 provided with reduction gears, which is one example of a rotational drive device, is installed on the upper face of the supporting member 65, and a feed roller 68 having an outer circumference portion made from urethane is fixed to an output axle which extends in a downward direction from the induction motor 66. This induction motor 66 is composed so as to impart a feed rotational force A to the feed roller 68.

An adjustable swing restricting member 69 in the form of a nut and bolt arrangement is provided between and through the bracket 62 and the supporting member 65, passing through the vertical axle 63 arranged in the middle therebetween, and furthermore, a compression spring 70 fitted on the outer side of the bolt, is provided between the bracket 62 and the supporting member 65. One example of feeding means 60 is constituted by the elements 61 to 70, and the like.

Consequently, the feeding means 60 causes the supporting member 65 and the link member 64 to swing towards the inner side about a vertical axis 71, due to the elastic repulsive force of the compression spring 70, and hence the feed roller 68 is urged in a direction which causes it to abut on the passive surfaces 15. The position of maximum approach is restricted by the swing restricting member 69.

In FIG. 2, braking means 75 for applying a braking force to the movable body 10 by acting on the passive surfaces 15 is provided on the last end portion of the linear shaped path section 5a. This braking means 75 has a similar structure to the feeding means 60 and comprises a braking roller 76 which is able to abut on the passive surfaces 15 of the movable body 11 from the side thereof, and is made of urethane, for example, and a rotational drive device 77, which is interlocked to this braking roller 76 and which applies a feeding rotational force B to the braking roller 76. The rotational drive device 77 comprises a torque motor, or the like, and the feeding rotational force B is set so as to be smaller than the feeding rotational force A of the induction motor 56, in other words, such that A>B.

Consequently, a composition is achieved whereby, in the linear shaped path section 5a, a plurality of movable bodies 10 travel between the feeding means 60 and the braking means 75 in an aligned fashion, without any gaps arising between the respective front and rear ends thereof, in other words, in a state where the front and rear abutting sections 16, 17 are mutually abutting, the movable bodies are pushed tightly from the rear.

Figure 11:
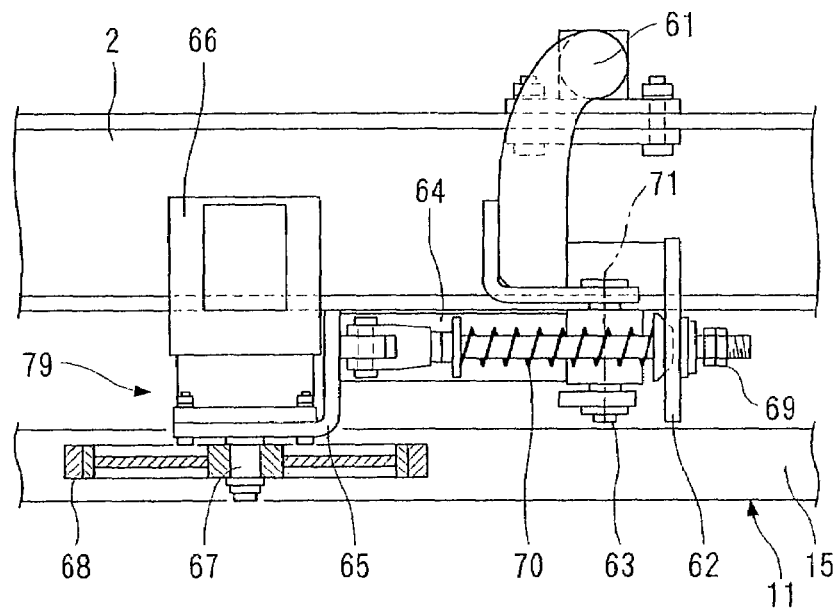
FIG. 11 is a partially cutaway side view of a curved section-feeding means section in the conveyance apparatus using movable bodies.
Figure 12:
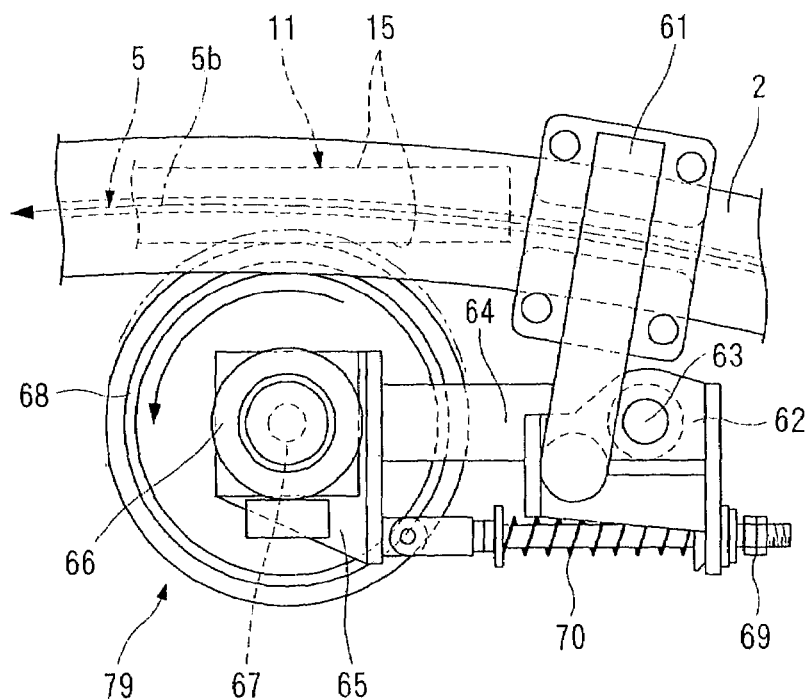
FIG. 12 is a plan view of the curved section-feeding means section in the conveyance apparatus using movable bodies.

In the linear shaped path section 5c, or the other fixed path 5A, or the like, there is provided feeding means 78 similar to the feeding means 60. Furthermore, as shown in FIG. 11 and FIG. 12, feeding means 79 similar to the feeding means 60 is provided in the curved path section 5b. Moreover, in FIG. 11 and FIG. 12, constituent elements which are the same as the feeding means 60 are labelled similarly and detailed description thereof is omitted. Here, the arrangement pattern of the respective means 60, 75, 78, 79 is altered variably, and part or all of the respective means 60, 75, 78, 79 may be omitted.

As shown in FIG. 1, FIG. 2, FIG. 13–FIG. 16 and FIG. 20, a pair of (plurality of) lateral travel rail members 80A, 80B for supporting and guiding the guided devices 30, 40 in such a manner that the middle frame member 13 fitted with the supporting section 50 assumes an orthogonal state with respect to the direction of travel, are provided to the side of the prescribed region 5d, and hence the region in which the lateral travel rail members BOA, 80B are provided is formed into the working path section 6 relating to the conveyed items. Here, the lateral travel rail members BOA, 80B are positioned in a state where the majority portions thereof are respectively parallel, the positioning interval $L_1$ therebetween being set to the same value as the vertical axis to vertical axis distance $L_2$ between the vertical axes 21a in the middle frame member 13. The start and end parts of the lateral travel rail members BOA, 80B are formed suitably into curved shapes, for the purpose of branching and joining.

Branching means 81 for branching the guided members 30, 40 located on the main rail 2, onto either of the lateral travel rail members BOA, BOB, is provided at the start side of the prescribed region 5d, and joining means 85 for joining together guided members 30, 40 arriving from the respective lateral travel rail members BOA, BOB, is provided at the end side of the lateral travel rail members BOA, BOB.

More specifically, the branching means 81 is constituted by divided rail members 82A, 82B formed by splitting the main rail 2, which are disposed at two locations corresponding to the lateral travel rail members BOA, BOB, and operating devices (such as cylinder devices) 84A, 84B, or the like, for causing these divided rail members 82A, 82B to rotate about the axes of vertical axles 83A, 83B. Here, a composition is adopted whereby, when caused to rotate, the upstream ends of the divided rail members 82A, 82B are always connected to the main rail 2, and the downstream ends thereof are connected selectively to either the main rail 2 or to a lateral travel rail member 80A, 80B.

The joining means 85 has a similar structure to the branching means 81, and comprises divided rail members 86A, 86B formed by splitting the main rail 2A, and operating devices 88A, 88B, or the like, for causing these divided rail members 86A, 86B to rotate about the axes of the vertical axles 87A, 87B, the joining means 85 being disposed in a symmetrical position with respect to the branching means 81.

By means of the divided rail members 82A, 82B being operated and caused to perform branching by the branching means 81 (described in detail hereinafter), a movable body 10 can be caused to travel laterally in the working path section 6, in a state where the front frame member 12 of the movable body 10 is aligned with one of the lateral travel rail members 80A, the middle frame member 13 fitted with the supporting section 50 is caused to assume an orthogonal state with respect to the direction of travel, and the rear frame member 14 assumes a bent state in alignment with the other lateral travel rail member 80B.

Figure 3:
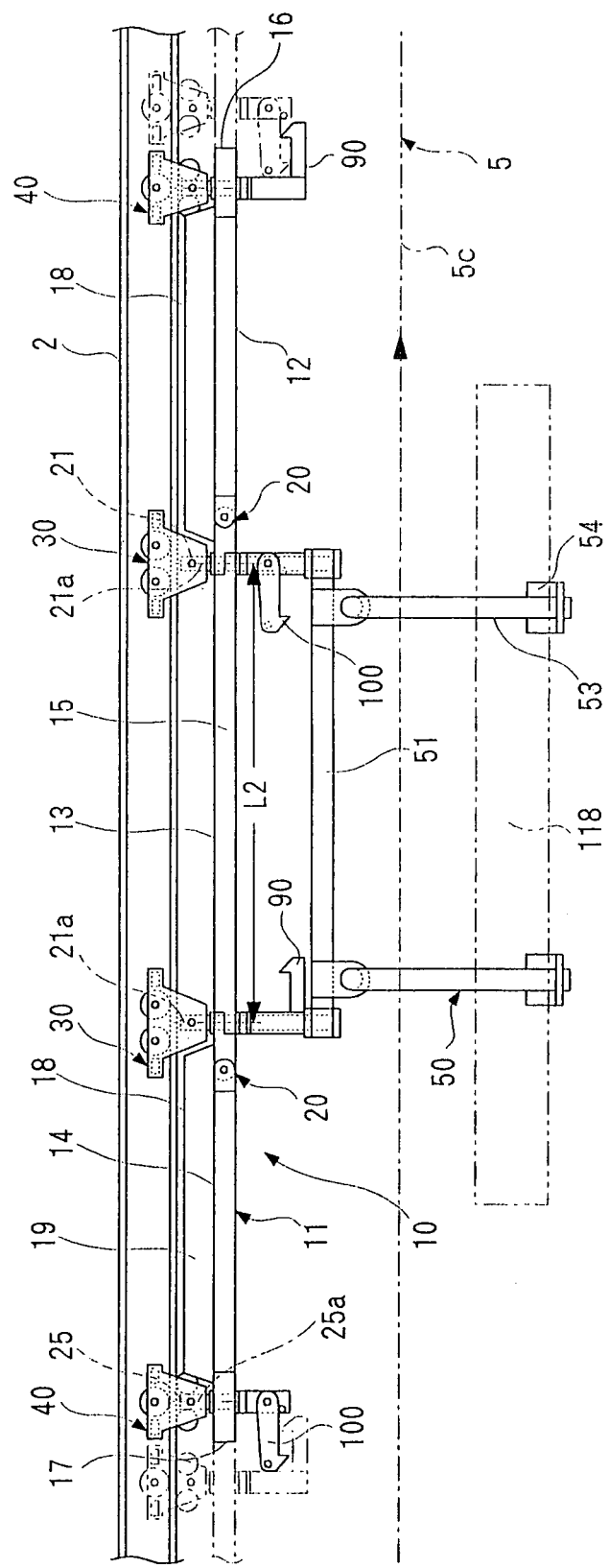
FIG. 3 is a side view of a movable body in a linear path section of the conveyance apparatus using movable bodies.
Figure 6:
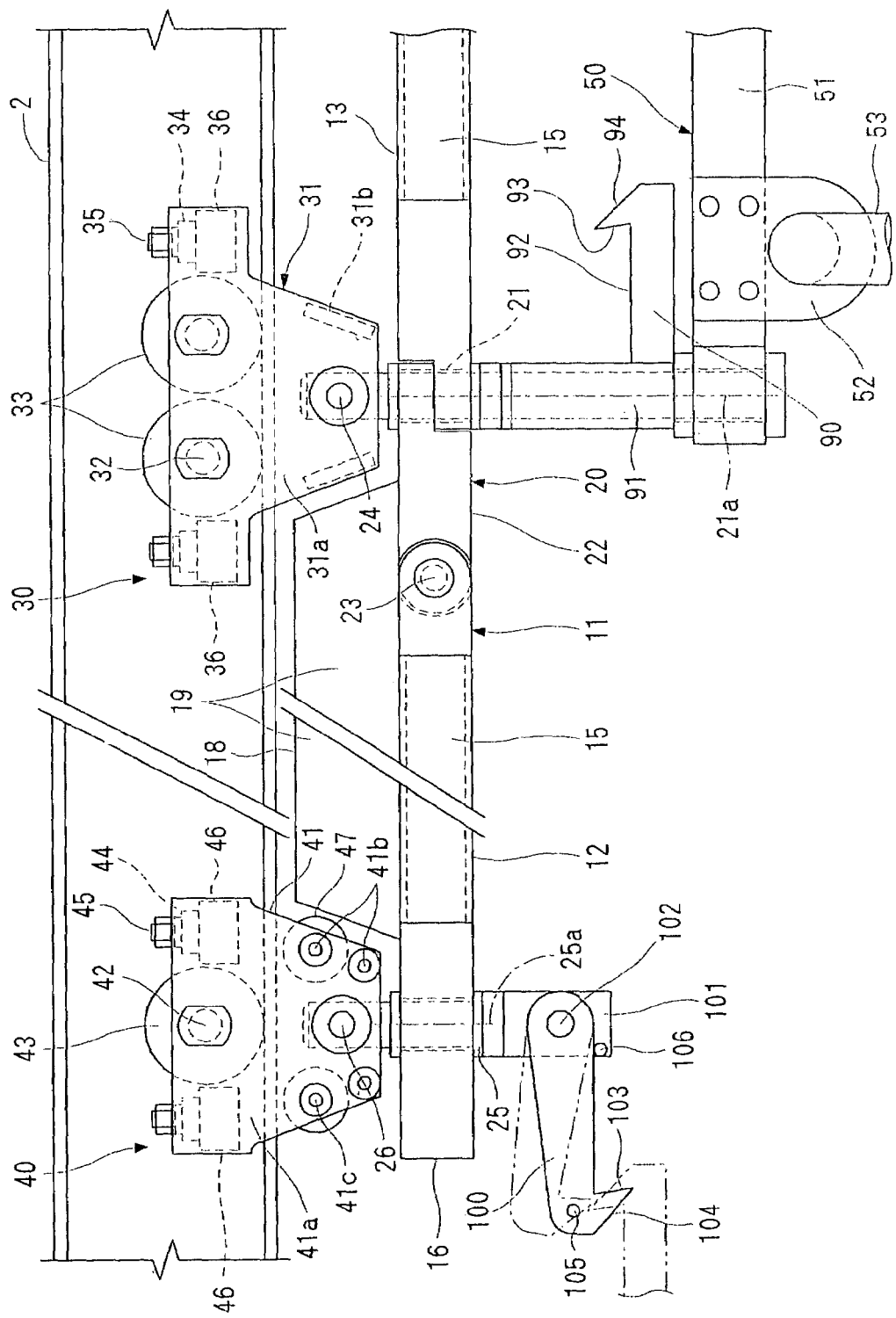
FIG. 6 is a side view of a principal section of the movable body in the conveyance apparatus using movable bodies.
Figure 7:
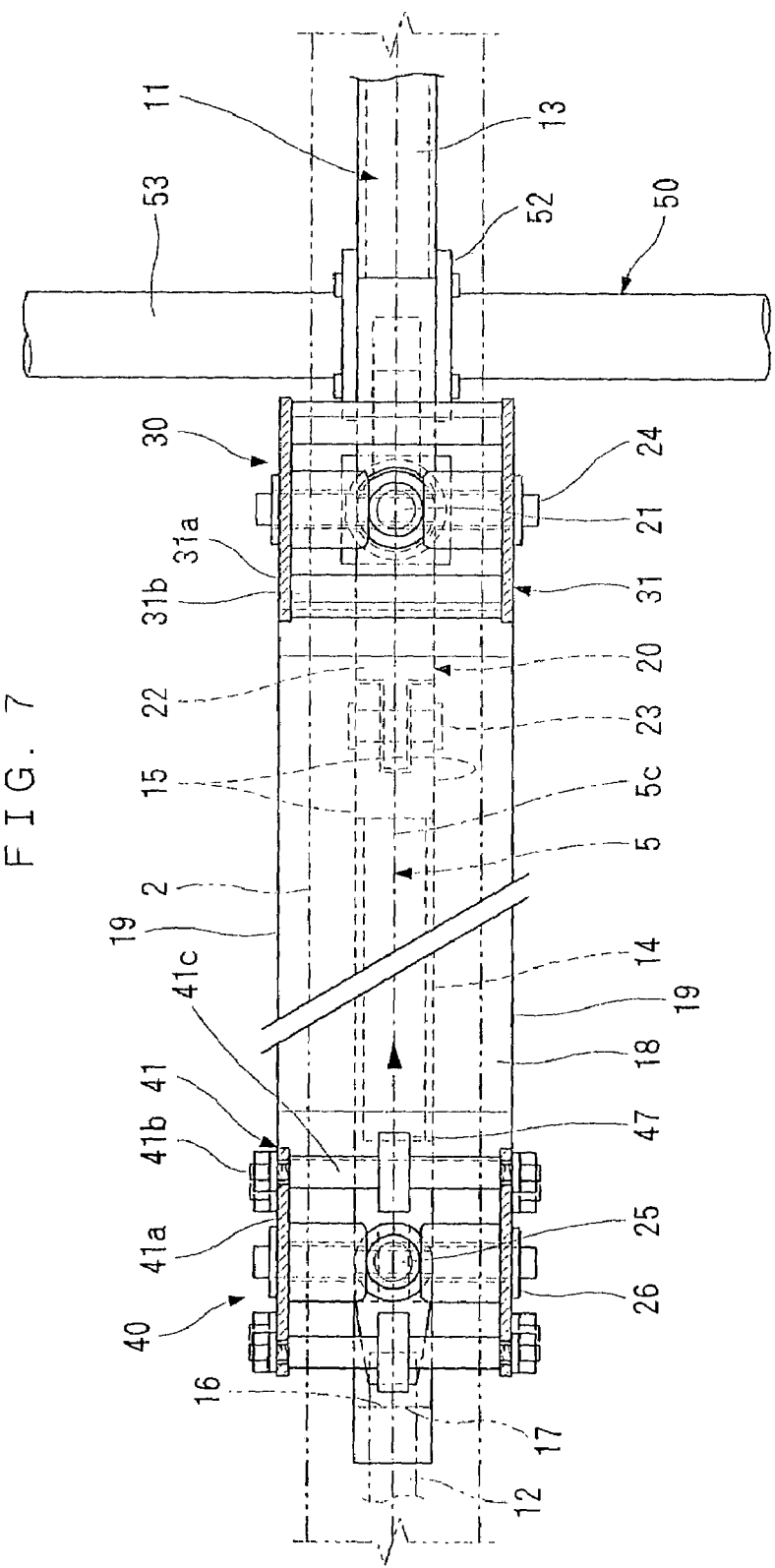
FIG. 7 is a partially cutaway plan view of a principal section of the movable body in the conveyance apparatus using movable bodies.

A composition is achieved whereby, in the working path section 6, when a plurality of movable bodies 10 are supported and guided between the lateral travel rail members 80A, 80B, it is possible to couple adjacent guided members 30, 40 of preceding and following movable bodies 10 in the direction of travel. In other words, as illustrated in FIG. 3 and FIG. 6, coupling receiver members 90 are provided on the vertical axle 25 connected to the leading end guided member 40 and the vertical axle 21 connected to the trailing middle guided member 30, and coupling members 100 are provided on the vertical axle 21 connected to the leading middle guided member 30 and the vertical axle 25 connected to the trailing end guided member 40.

The coupling receiver members 90 are fixed to the lower ends of the vertical axles 21, 25 by means of connecting members 91, and are formed with recess sections 92 which are open on the upper face thereof and project in a forward direction, a coupling receiver face 93 being formed by the rearward orientated face forming the recess section 92. A cam guide face 94 which increases in height in the rearward direction is formed on the front end of the coupling receiver member 90.

The coupling members 100 are connected swingably in the vertical direction on brackets 101 fixed to the middle portion of the vertical axles 21, 25, by means of horizontal pins 102. The coupling members 102 are hook-shaped, the projecting portion thereof being disposed to the rear side and extending in a downward direction, and a coupling face 103 capable of engaging with the coupling receiver face 93 is formed by the forward orientated face of the projecting portion, in addition to which a cam guide face 104 capable of acting on the cam guide face 94 described above is formed on the rearward orientated face of the projecting portion, the height thereof increasing in the rearward direction. An operating pin 105 for causing the coupling member 100 to swing in the upward direction against its own weight is provided in the side portion of the coupling member 100, and a stopper member 106 for restricting the downward swing of the coupling member 100 due to its own weight is provided on a side of the bracket 101.

The recess section 92 of the coupling receiver member 90 is formed to have a prescribed length in the front/rear direction, and hence, even if it is in a coupled state with the coupling member 100, in the linear shaped path sections 5a, 5c, or the like, contact between the abutting sections 16, 17 is still possible.

As shown in FIG. 1, FIG. 2, FIG. 15, FIG. 19 and FIG. 20, pulling means 108 for pulling the movable body 10 towards the lateral travel rail members 80A, 80B is provided in the start end portion of the working path section 6. Moreover, motional force applying means 110 for applying a motional force to the movable body 10 supported by the lateral travel rail members 80A, 80B, and feed-in means 112 for propelling the movable body 10 towards the fixed path 5A, are provided in the final end portion of the working path section 6. The pulling means 108, the motional force applying means 110 and the feed-in means 112 have a similar composition to the feeding means 60, and the constituent elements which are the same as the feeding means 60 are similarly labelled and detailed description thereof is omitted here.

In this case, the pulling means 108, motional force applying means 110 and feed-in means 112 are disposed in such a manner that the feed roller 68 abuts against the upper passive surface 19 of the passive member 18 provided on the front frame member 12 or rear frame member 14, and the supporting plate members 31a, 41a of the guided devices 30, 40, on the outer sides thereof. The motional force applying means 110 comprises backup rollers 109, 111, 113 which abut against the upper passive surface 19 of the passive member 18, from the inner side thereof, and are disposed so as to form pairs with the feed rollers 68.

The pulling means 108, motional force applying means 110 and feed-in means 112 are respectively positioned on the outer side of the lateral travel rail members 80A, 80B. Here, the arrangement pattern of the pulling means 108, motional force applying means 110 and the feed-in means 112 is altered variously, for instance, by providing the lateral travel rail member 80A and the lateral travel rail member 80B in separate positions in the direction of the working path section 6.

A guide member 115 for guiding the operating pin 105 of the coupling member 100 is provided on the final end side of the direction of travel in the working path section 6, and hence by means of the operating pin 105 being guided by the guide pin 115, the coupling member 100 is caused to swing upwards against its own weight, thereby releasing the coupling thereof.

Below, the operation of the first embodiment described above is described.

As shown in FIG. 2, a movable body 10 which has moved along the linear shaped path section 5a due to the conveyance rotational force of the feeding means 78, or the like, is applied with a motional force (travel force) by the conveyance rotational force A of the feeding means 60 provided in the linear shaped path section 5a.

More specifically, as shown by the dotted line C in FIG. 10, the feed roller 68 projecting on the inner side is caused to contact the passive surfaces 15 of the moving body 10 arriving there, by means of the elastic force of the compression spring 70, whereby, as shown by the solid lines in FIG. 10, it is pressed against the passive surfaces 15 in a retracted state, against the elastic force of the compression spring 70. In this case, the feed roller 68 is driven in rotation by the induction motor 66, and therefore, since the feed roller 68 which is subjected to forced rotation is in pressure contact with the passive surfaces 15, motional force is imparted to the movable body 10 due to the conveyance rotational force A thereof.

Figure 4:
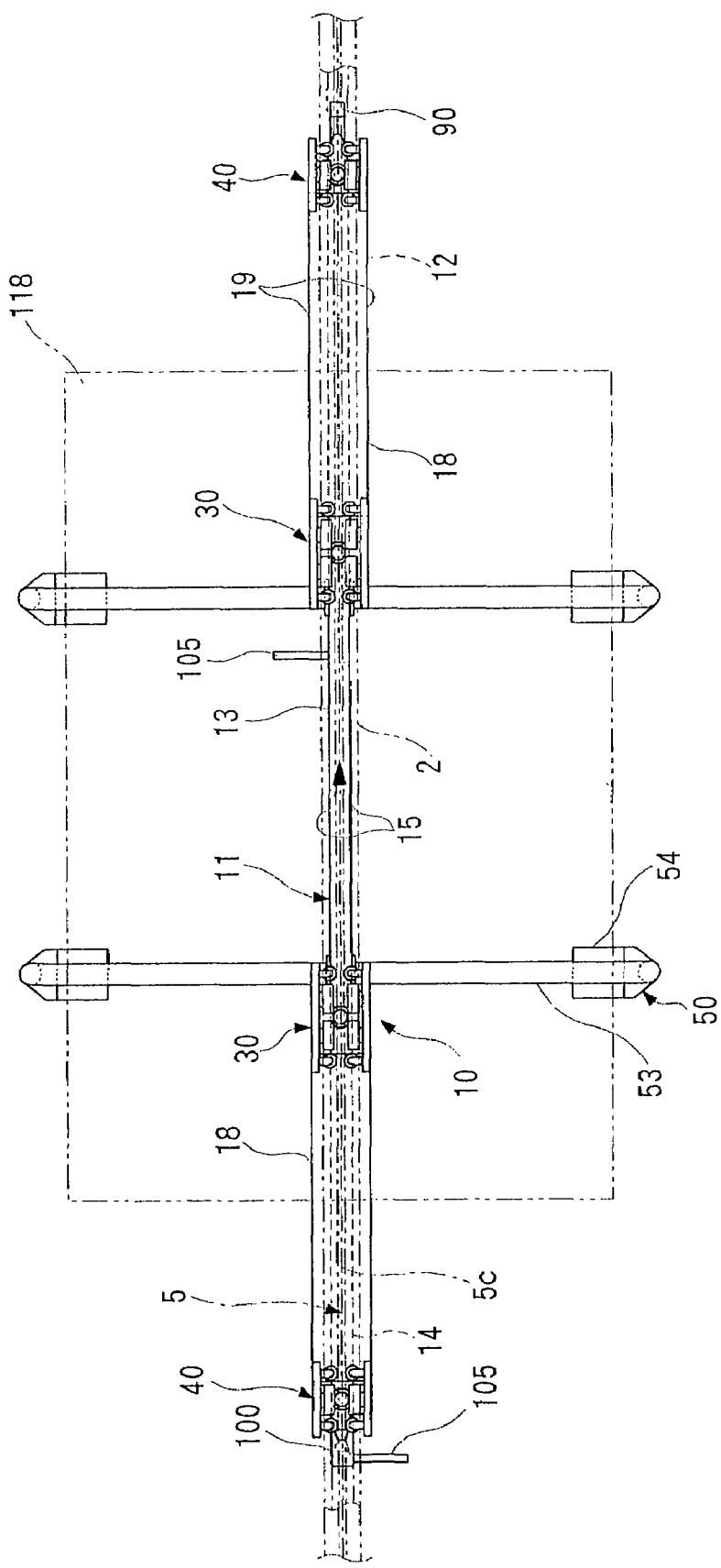
FIG. 4 is a plan view of the movable body in the linear path section of the conveyance apparatus using movable bodies.

Here, the abutting section 16 of the front end portion of the introduced movable body 10 abuts on the abutting section 17 of the rear end portion of the last movable body 10 of a movable body 10 group situated in a train-like formation on the linear shaped path section 5a, and thus the group of movable bodies 10 situated in a train-like formation on the linear shaped path section 5a is caused to move at a prescribed speed by the conveyance rotational force A of the feeding means 60, and the group of movable bodies 10 situated in a train-like formation on the linear shaped path section 5a is pushed from the rear and caused to move (see dotted lines in FIG. 3 and FIG. 4).

The braking means 75 applies a braking force to the movable bodies 10 which have moved along the linear shaped path section 5a and have arrived at the final end side thereof. In other words, in the braking means 75, a braking roller 76 which is pressed against the passive surfaces 15 by an action similar to that of the feeding means 60 is caused to rotate forcibly, and a braking force is applied to the movable body 10 by the conveyance rotational force B thereof.

Here, since the conveyance rotational force A of the feeding means 60 is greater than the conveyance rotational force B of the braking roller 76, the movable body 10 corresponding to the braking means 75 is caused to move whilst receiving a braking action, in accordance with the differential between the forces. Consequently, in the linear shaped path section 5a, a plurality of movable bodies 10 are caused to move in an aligned fashion between the feeding means 60 and the braking means 75, whilst being pressed tightly from the rear, without any gaps occurring between the front and rear ends thereof.

The movement of the movable bodies 10 by the feeding means 60 as described above is performed by means of the feed roller 68 thereof acting successively on the passive surfaces 15 of the front frame member 12, and then from that to the passive surfaces 15 of the middle frame member 13, and on to the passive surfaces 15 of the rear frame member 14. Moreover, the feed roller 68 also acts on a passive surface on the side face of the connecting member 22 in the connecting device 20.

In this case, when the feed roller 68 acts on the front frame member 12, the middle frame member 13 and the rear frame member 14 are pulled and moved by means of the connecting device 20. Moreover, when the feed roller 68 acts on the middle frame member 13, the front frame member 12 is pushed and moved via the connecting device 20, and the rear frame member 14 is pulled and moved via the connecting device 20. Furthermore, when the feed roller 68 acts on the rear frame member 14, the middle frame member 13 and front frame member 12 are pushed and moved via the connecting device 20.

In this way, whilst a group of movable bodies 10 are moved in an intermittent or consecutive manner along the linear shaped path section 5a, or whilst they are intermittently halted, a floor-based operator, for example, can proceed with a variety of operations with respect to the conveyed items 115 supported by the supporting section 50, from below. Alternatively, a group of empty or full movable bodies 10 can be stored on the linear shaped path section 5a, whilst being moved in an intermittent or continuous fashion.

As shown in FIG. 2, a movable body 10 moved so as to be projecting from the region of the braking means 75, is moved along the curved path section 5b by feeding means 79, whereupon it is conveyed along the linear shaped path section 5c. In this linear shaped path section 5c, the movable body 10 is moved by the feeding means 78 and enters into the prescribed region 5d.

More specifically, in the prescribed region 5d, as illustrated in FIG. 1, the divided rail members 82A, 82B are connected to the main rail 2 at the upstream end thereof and are connected to the main rail 2 at the downstream end thereof. Thereby, the divided rail members 82A, 82B are disposed in an integral, linear fashion with respect to the main rail 2. Consequently, when there is no requirement to branch off a movable body 10 into the working path section 6, the movable body 10 is caused to move and pass through the prescribed region 5d, with the divided rail members 82A, 82B in the state.

Figure 16:
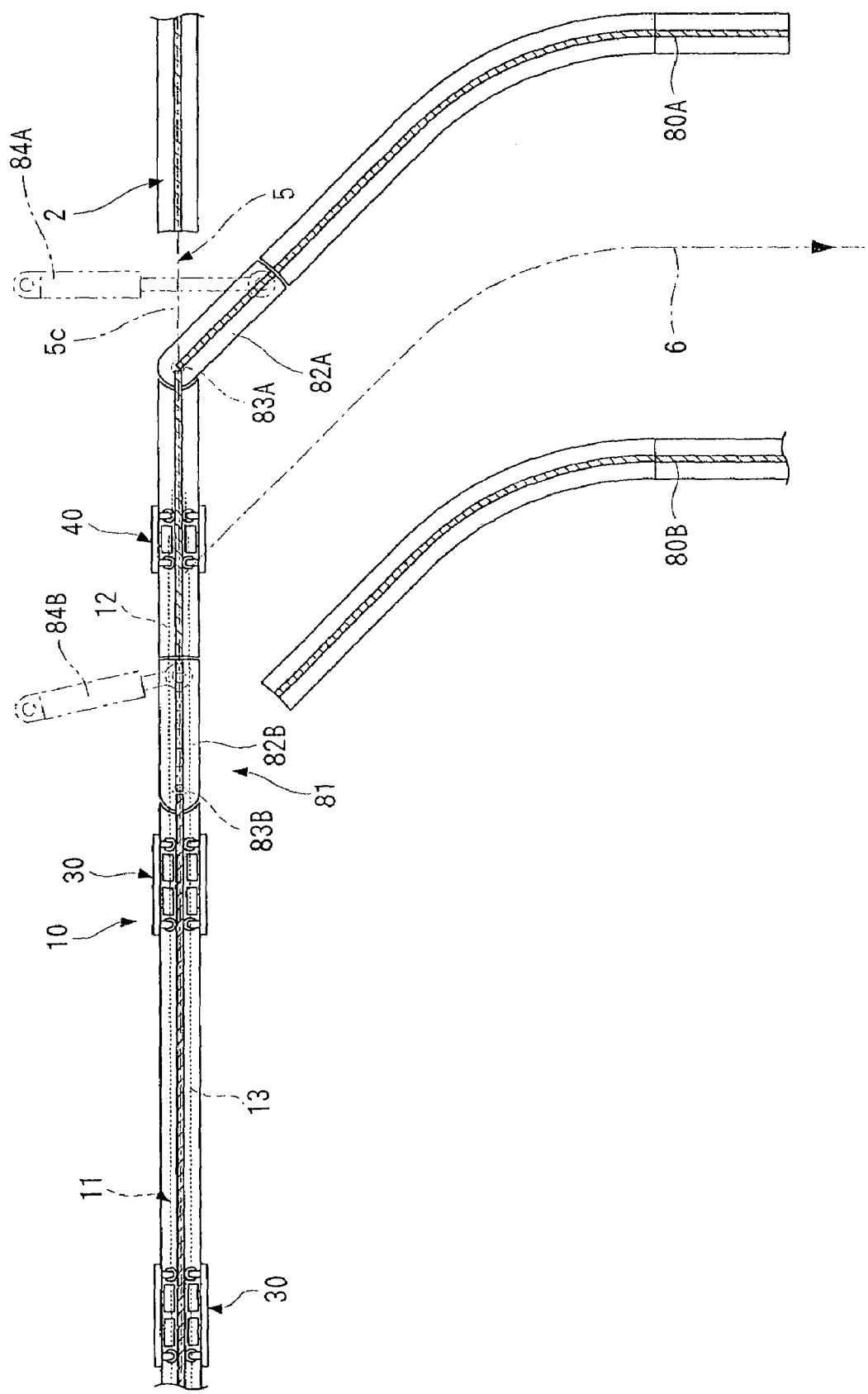
FIG. 16 is a partially cutaway plan view of the conveyance apparatus using movable bodies, before branching is started.
Figure 17:
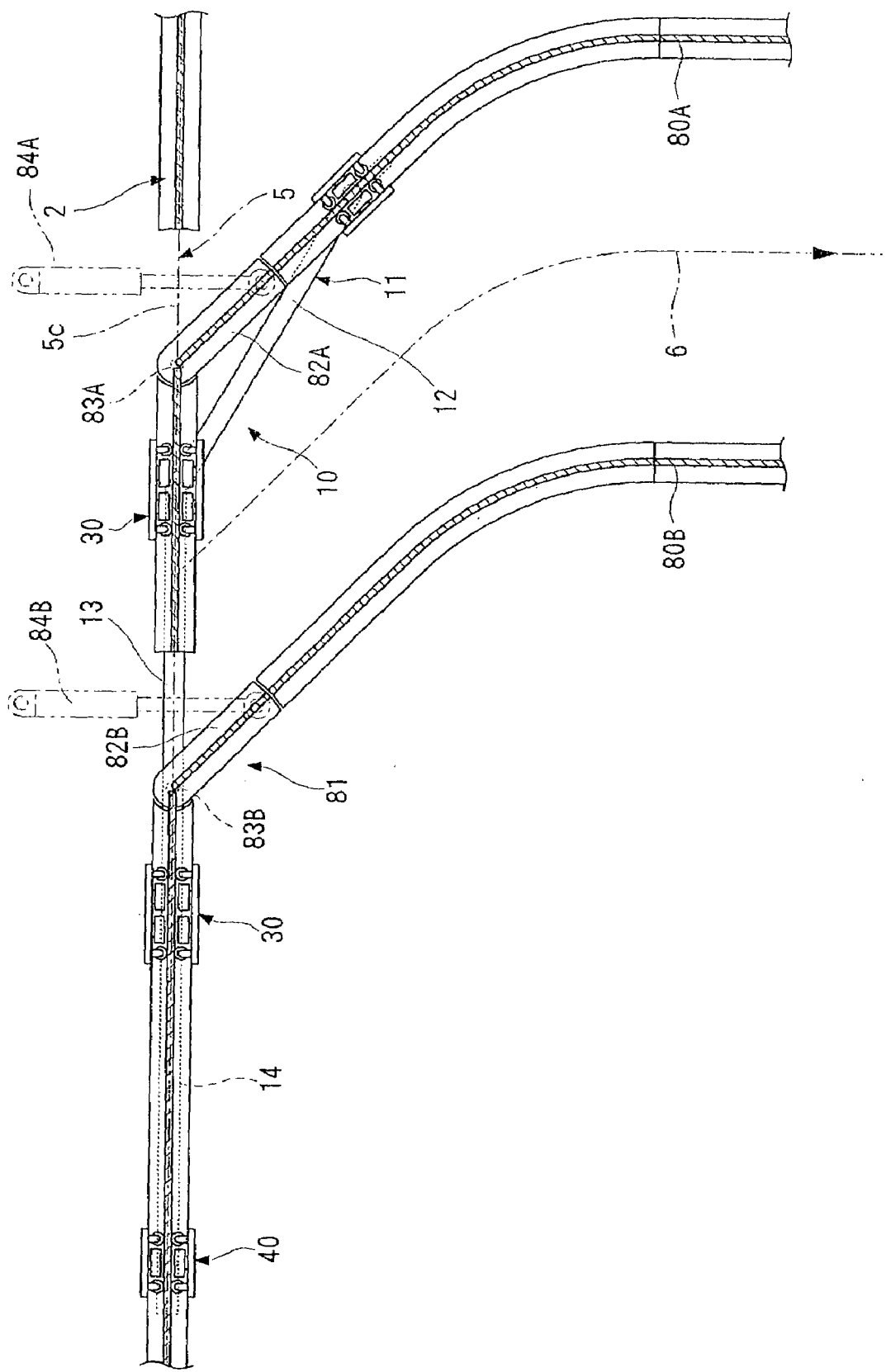
FIG. 17 is a partially cutaway plan view of the conveyance apparatus using movable bodies, when branching is started.

Furthermore, if a movable body 10 is to be branched off into the working path section 6, then firstly, as illustrated in FIG. 16, the lower side operating device 84A in the branching means 81 is operated, and the divided rail member 82A is caused to rotated about the vertical axis 83A, in such a manner that the downstream end thereof connects with the lateral travel rail member 80A. Thereby, after the leading end guided device 40 of the movable bodies 10 has passed from the upper side divided rail member 82B to the main rail 2, then as illustrated in FIG. 17, it will pass via the divided rail member 82A onto the lateral travel rail member 80A.

In this case, the front side middle guided device 30 passes along the upper side divided rail member 82B, and by detecting the passage thereof, the upper side operating device 84B of the branching means 81 is operated, thereby causing the divided rail member 82B to turn about the vertical axis 83B and connecting the downstream end thereof to the lateral travel rail member 80B.

Figure 18:
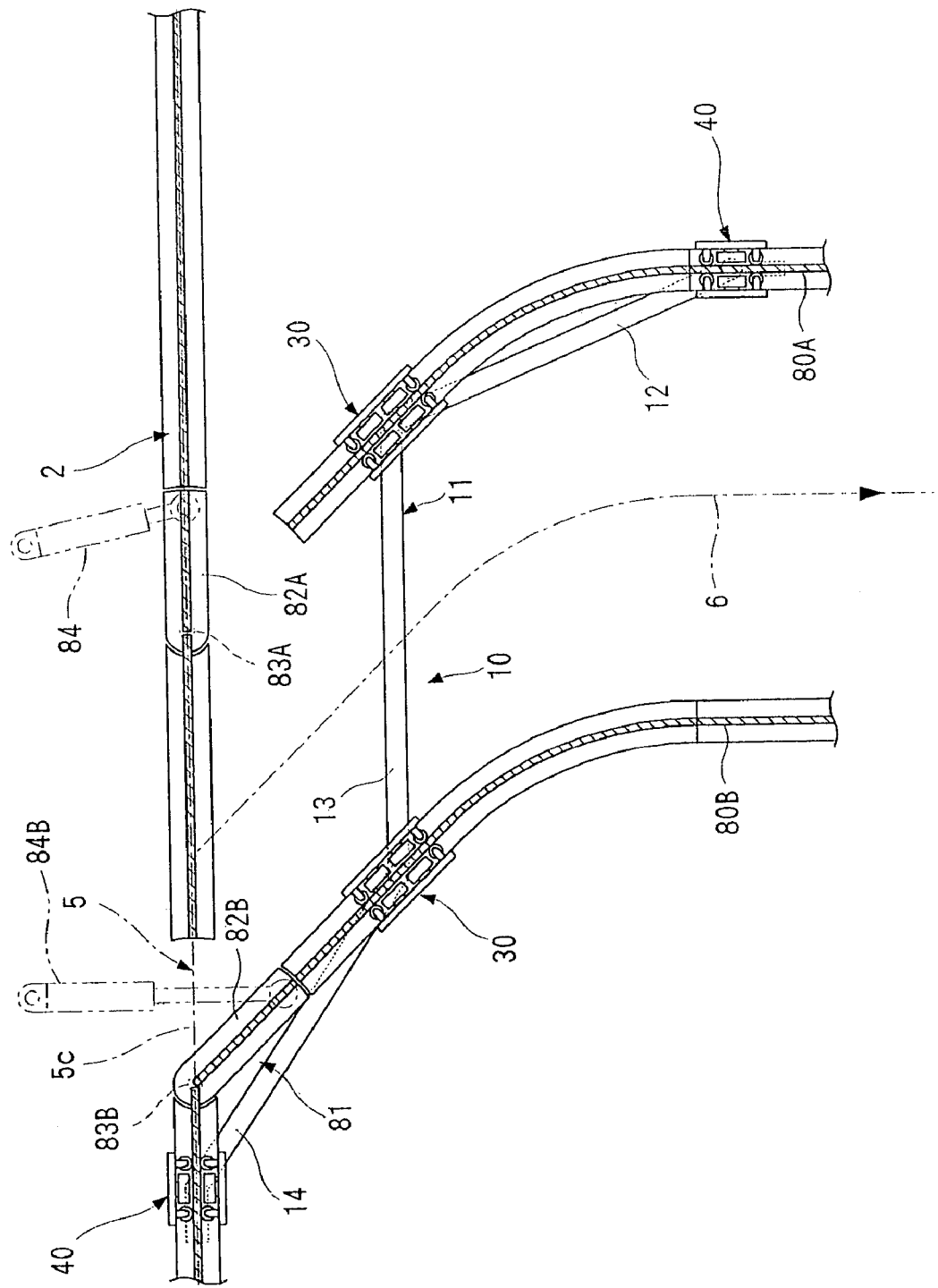
FIG. 18 is a partially cutaway plan view of the conveyance apparatus using movable bodies, during branching.

Therefore, as illustrated in FIG. 18, after the front side middle guided device 30 has passed from the upper side divided rail member 82B to the main rail 2, similarly to the leading end guided device 40, it passes via the divided rail member 82A onto the lateral travel rail member 80A. In a similar manner to this, the rear side middle guided device 30 moves onto the lateral travel rail member 80B via the lower side divided rail member 82B. Thereupon, the rear side end guided device 40 moves onto the lateral travel rail member 80B via the lower side divided rail member 82B, similarly to the rear side middle guided device 30.

Figure 13:
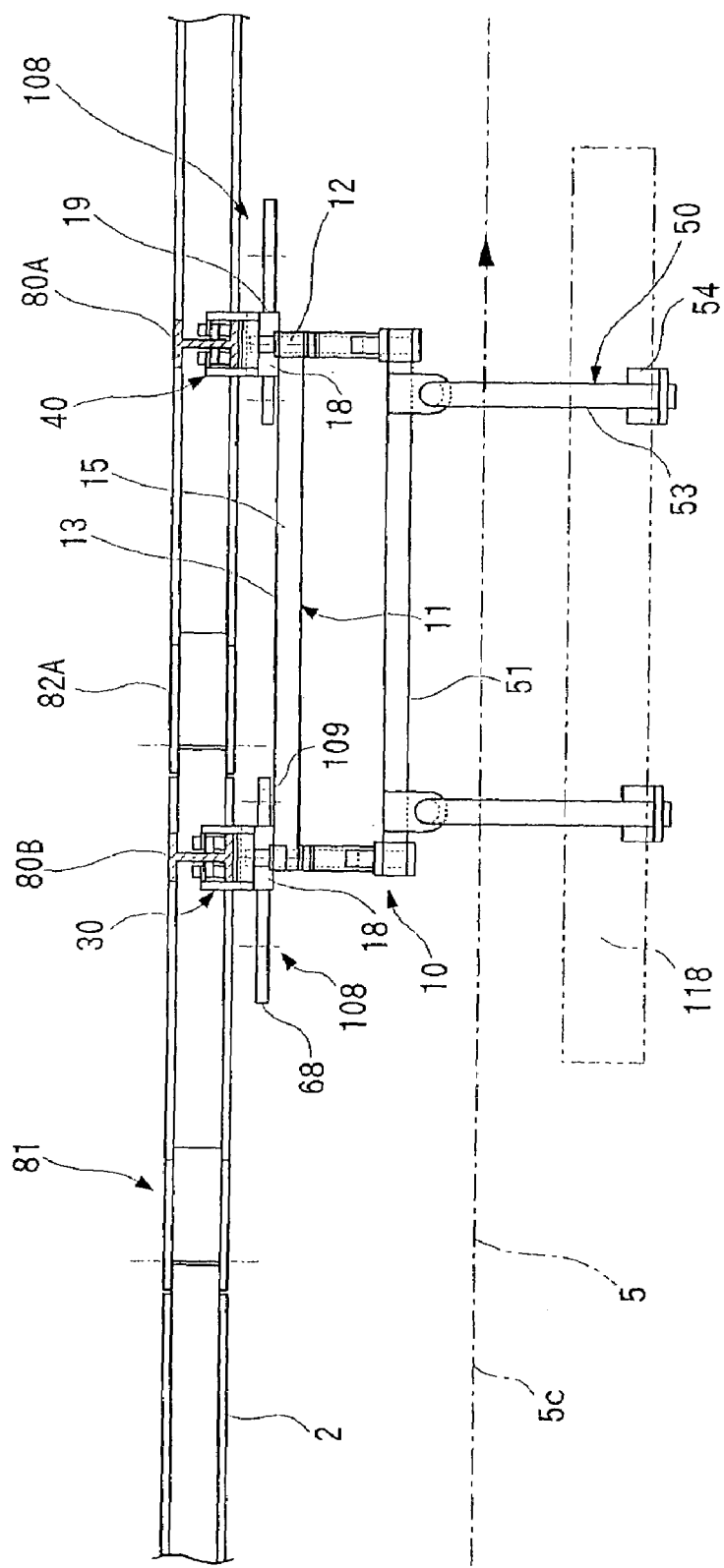
FIG. 13 is a front view of a start end section of a working path section in the conveyance apparatus using movable bodies.
Figure 19:
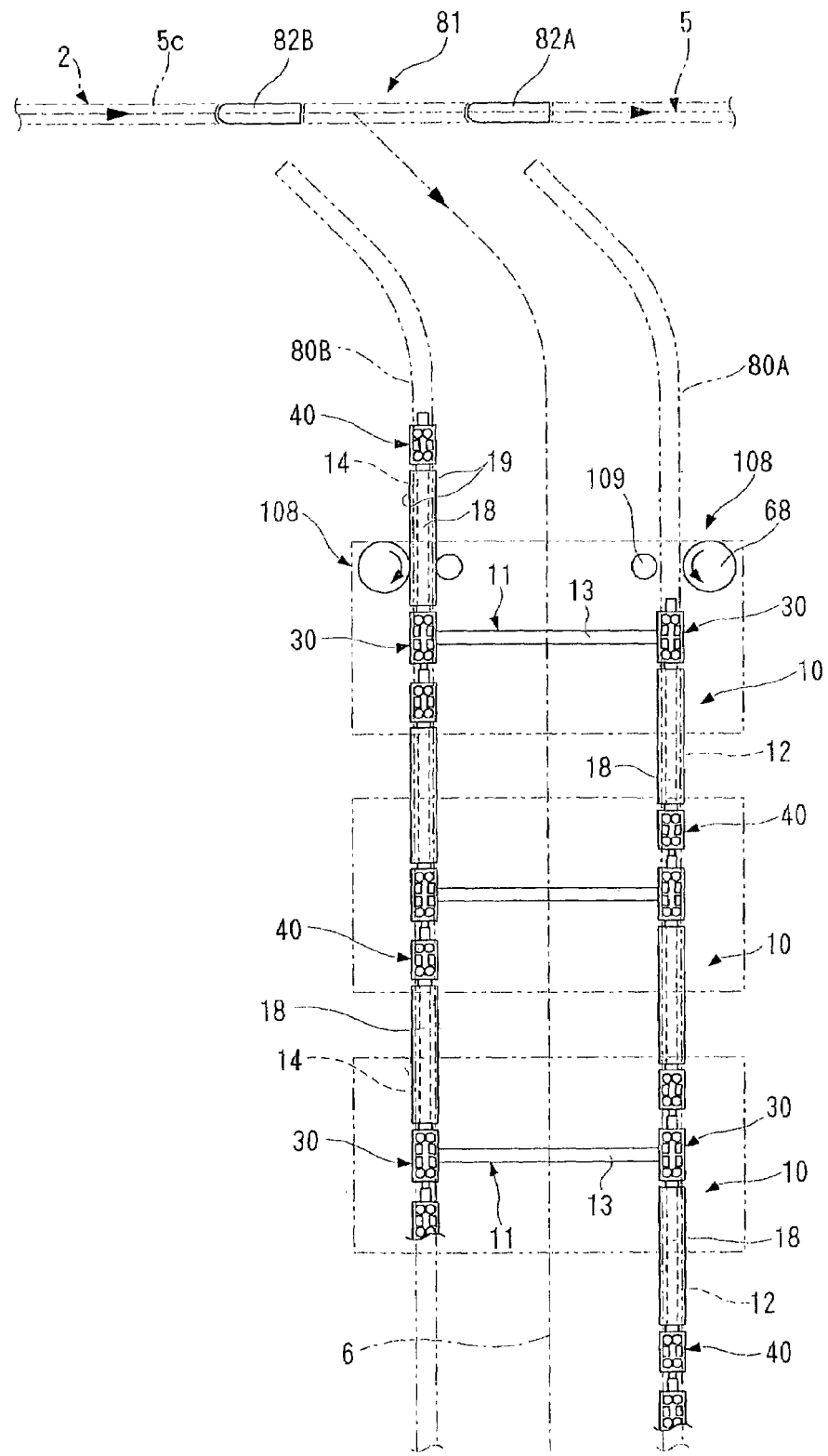
FIG. 19 is a partially cutaway plan view of the conveyance apparatus using movable bodies, when branching is finished.

In this way, as illustrated in FIG. 1, FIG. 13 and FIG. 19, the movable body 10 is branched off into the working path section 6 in a state wherein the front frame member 12 of the movable body 10 is aligned in a preceding fashion with one of the lateral travel rail members 80A, the middle frame member 13 which is fitted with the supporting section 50 adopts an orthogonal attitude with respect to the direction of travel, and furthermore, the rear frame member 14 is bent in the opposite direction so as to be aligned with the other lateral travel rail member 80B, in a trailing fashion. The divided rail members 82A, 82B are then rotated back in such a manner that the downstream ends thereof connect with the main rail 2.

Figure 15:
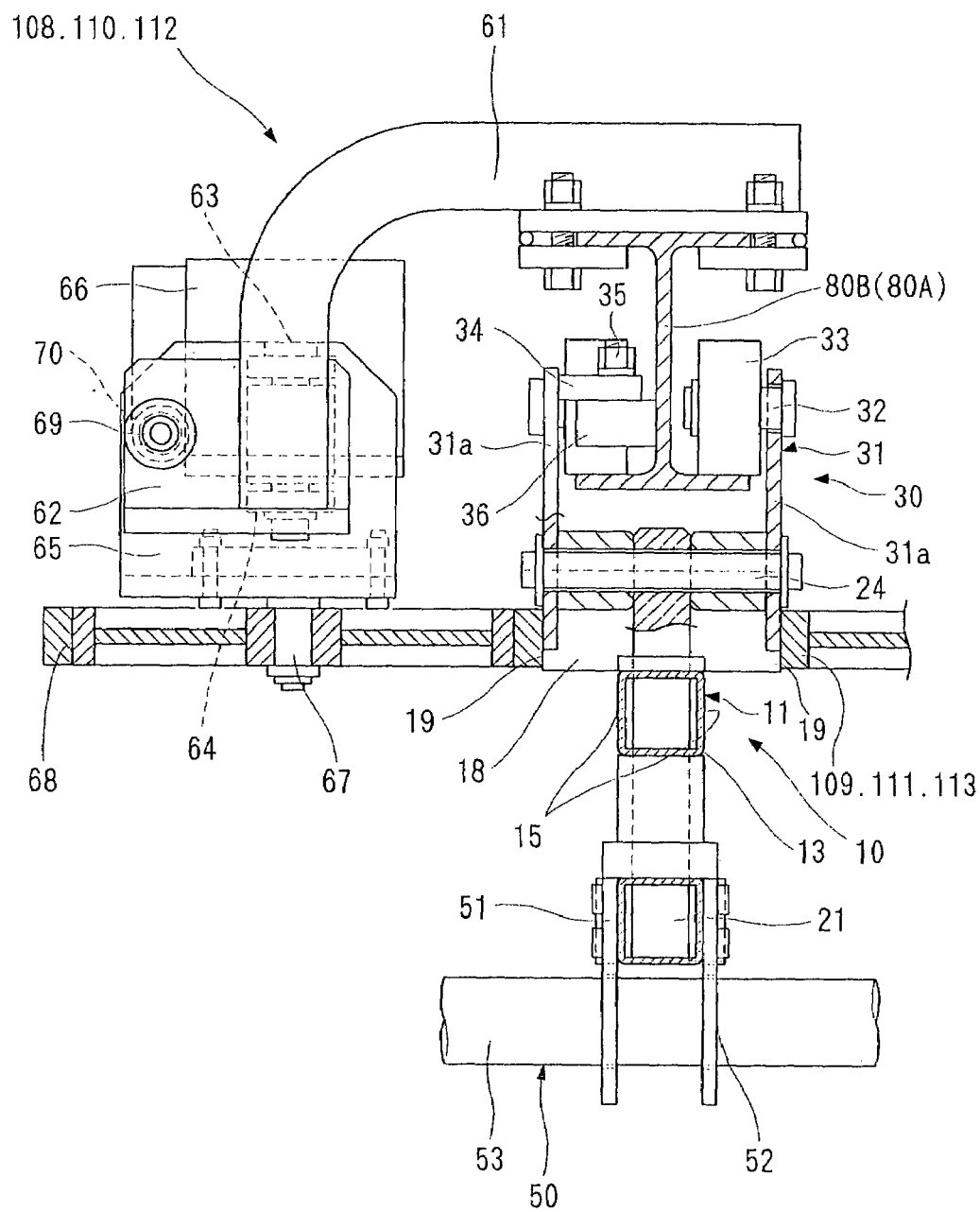
FIG. 15 is a partially cutaway front view of various means in the working path section in the conveyance apparatus using movable bodies.

As illustrated by FIG. 15 and FIG. 19, when a movable body 10 has been branched off onto the working path section 6 in this way, the feed roller 68 of the pulling means 108 engages with the outer side of the upper passive surface 19 of the passive member 18 provided on the front frame member 12 or rear frame member 14, and with the supporting plate members 31a, 41a of the guided members 30, 40, thereby causing the movable body 10 to be pulled into the working path section 6 in the bended attitude, and then to be conveyed laterally. In this case, the pulling force of the feed roller 68 is transmitted reliably by means of the backup roller 109 in contact with the inner sides of the upper passive surface 19 of the passive member 18, and the supporting plate members 31a, 41a of the guided members 30, 40.

The movable body 10 pulled in this way is then coupled with the movable body 10 which precedes it. More specifically, the movable body 10 positioned in front has a coupling member 100 provided on vertical axles 21, 25, facing in a rearward direction. The laterally conveyed movable body 10 has a coupling receiver member 90 provided on the vertical axles 21, 25, facing in a forward direction.

In this state, when the laterally conveyed movable body 10 approaches the preceding movable body 10, firstly, the cam guide face 94 of the coupling receiver member 90 abuts on the cam guide face 104 of the opposing coupling member 100, whereby the coupling member 100 is caused to swing upwards about the horizontal pin 102, against its own weight, as illustrated by the dotted line in FIG. 6. By means of the cam guide face 94 passing over the cam guide face 104, the coupling member 100 then swings downwards about the horizontal pin 102, due to its own weight, whereby the front end portion thereof falls into the recess section 92, the coupling face 103 thereof abuts on the coupling receiver face 93, and the coupling member 100 is thus coupled to the coupling receiver member 90.

In this case, in the group of movable bodies 10 branched off onto the working path section 6, the feed roller 68 of the motional force applying means 110 provided on the final end side of the working path section 6 abuts on the outer sides of the upper passive surfaces 19 of the passive member 18 of the movable body 10 opposing it, and the supporting plate members 31a, 41a of the guided devices 30, 40 thereof, thereby causing the movable bodies 10 to be conveyed laterally in a train-like fashion, whilst maintaining the bended attitude. In this case, the conveyance driving force of the feed roller 68 is transmitted reliably by means of a backup roller 111 in contact with the inner sides of the upper passive surface 19 and the supporting plate members 31a, 41a.

By pulling and moving the group of movable bodies 10 in the working path section 6 in a train-like fashion by means of the motional force applying means 110 in this way, the motional force of the preceding movable body 10 is transmitted via the coupling member 100 thereof to the coupling receiver member 90 of the laterally conveyed movable body 10. By this means, the laterally conveyed movable body 10 receives a pulling force on the guided devices 30, 40 supported on the respective lateral travel rail members 80A, 80B, by means of the vertical axles 21, 25. In other words, the laterally conveyed movable body 10 is pulled and conveyed thereafter in a train-like fashion.

Figure 14:
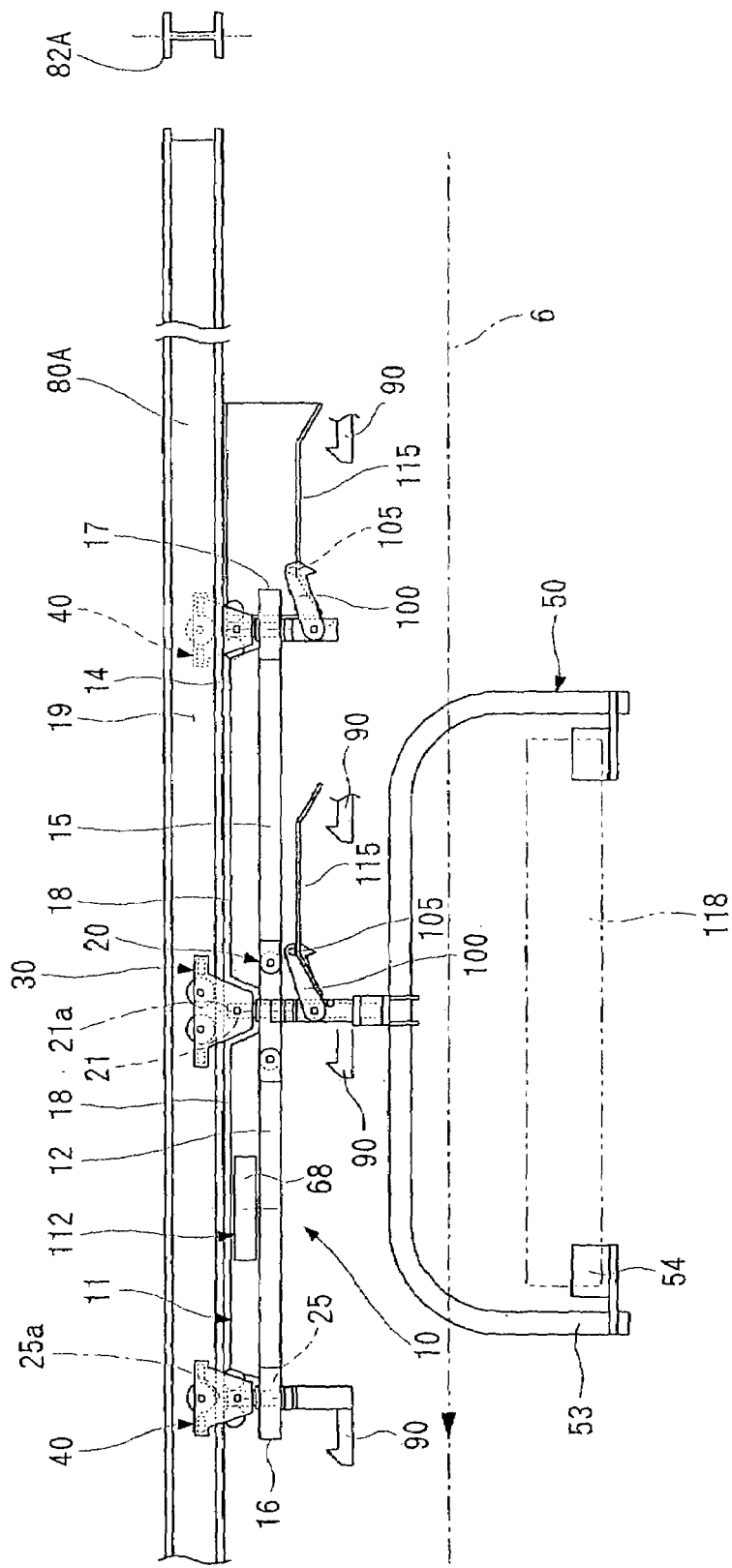
FIG. 14 is a side view of a final end section of the working path section in the conveyance apparatus using movable bodies.

When the leading movable body 10 reaches the final end portion of the working path section 6, the operating pin 105 provided on the coupling member 100 thereof is guided by the guide member 115, and coupling member 100 is caused to swing upwards against its own weight, thereby releasing the coupling thereof with the following movable body 10, as illustrated in FIG. 14. The leading movable body 10 is then joined into the fixed path 5A by the operation of the feed-in means 112. In this case, the joining operation is performed smoothly by means of the joining means 85 operating in a similar manner to the branching means 81.

Figure 20:
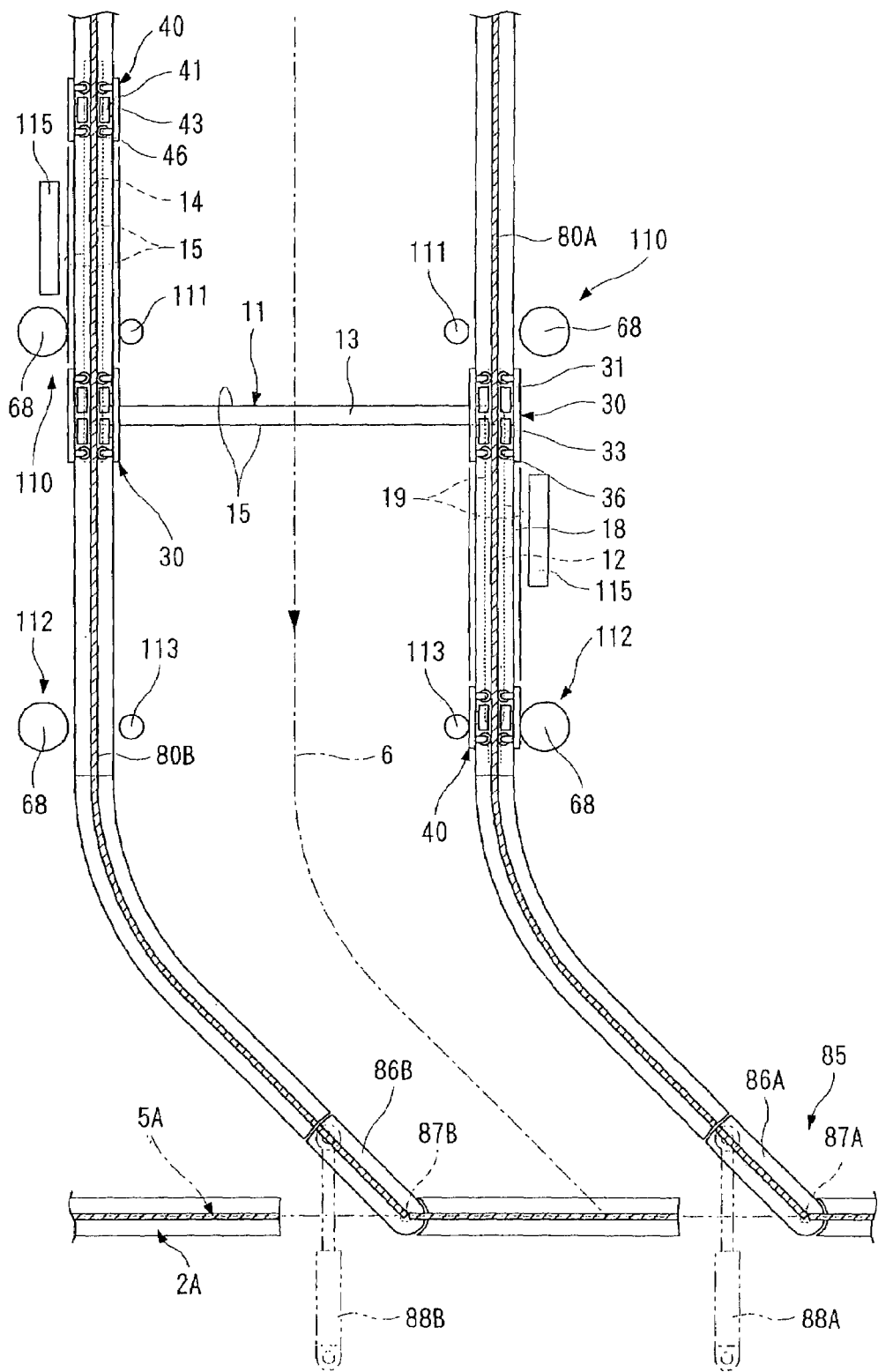
FIG. 20 is a partially cutaway plan view of the conveyance apparatus using movable bodies, before joining is started.

More specifically, by turning the two dividing rail members 86A, 86B about the vertical axes 87A, 87B, the upstream ends thereof are connected with the final end portions of the lateral travel rail members 80A, 80B, as shown in FIG. 20. By then applying a propelling force to the leading movable body 10 by the operation of feed-in means 112, firstly, the leading end guided device 40 of the movable body 10 is caused to flow from the lateral travel rail member 80A and onto the main rail 2A, by means of the divided rail member 86A. Thereupon, in a similar fashion, the front side middle guided device 30 flows from the lateral travel rail member 80A onto the main rail 2A by means of the divided rail member 86A, and in a simultaneous manner, the rear side middle guided device 30 flows onto the main rail 2A via the divided rail member 86B.

Here, by detecting the passage of the front side middle guided device 30 over the divided rail member 86A, the lower side operating device 88A of the joining means 85 is operated, and the divided rail member 86A is turned about the vertical axis 87A, thereby connecting the upstream end thereof with the main rail 2A. In this state, the rear side middle guided device 30 joined onto the main rail 2A is moved along the divided rail member 86A, and the rear side end guided device 40 is joined onto the main rail 2A via the divided rail member 86B, similarly to the rear side middle guided device 30, and is then moved over the divided rail member 86A. In this way, the respective frame members 12, 13, 14 of the movable body 10 can be moved over the main rail 2A in a linear fashion.

As described above, whilst a group of movable bodies 10 are moved in a train-like fashion in an intermittent or consecutive manner along the working path section 6, or whilst they are intermittently halted, a floor-based operator, for example, can proceed with a variety of operations with respect to the conveyed items 118 supported by the supporting section 50.

As illustrated in FIG. 19, in this case, since the front frame member 12 and rear frame member 14 are positioned in alignment with the downward direction of the two lateral travel rail members 80A, 80B, the spacing between the middle frame members 13 of preceding and following movable bodies 10 can be maintained at a distance corresponding to the length of the front frame member 12 or rear frame member 14. Thereby, the spacing between movable bodies 10 in the lateral travel direction can be maintained readily by a simple structure, and hence a group of movable bodies 10 can be moved laterally in the working path section 6 in such a manner that there is no mutual contact between conveyed items 118. Consequently, various types of work operations can be performed on the conveyed items 118, in a simple and accurate manner.

When the movable body 10 moves in the manner, the middle guided device 30 is supported and guided via the respective supporting rollers 33 on the main rails 2, 2A, the divided rail members 82A, 82B, and the lateral travel rail members 80A, 80B, and the respective guided rollers 35 contact with and are guided by the main rail 2, 2A, the divided rail members 82A, 82B, and the lateral travel rail members 80A, 80B.

Furthermore, the end guided device 40 is supported and guided via the respective supported rollers 43 on the main rails 2, 2A, the divided rail members 82A, 82B, and the lateral travel rail members 80A, 80B, and the respective guided rollers 46 contact with and are guided by the main rails 2, 2A, the divided rail members 82A, 82B, and the lateral travel rail members 80A, 80B, in addition to which the lift up prevention roller 47 opposes the main rails 2, 2A, the divided rail members 82A, 82B, and the lateral travel rail members 80A, 80B, from the under side thereof.

In this way, the movement of the movable bodies 10 is performed in a stable fashion, without catching, toppling, lifting up, or the like, and hence various tasks can be performed with respect to the conveyed items 118 and the conveyed items 118 can be loaded and unloaded in an accurate manner at all times.

In the train-like pushing movement along the fixed paths 5 described above, the main bodies 11 of the respective movable bodies 10, in other words, the respective frame members 12, 13, 14, assume a linear arrangement in plan view and side view, as illustrated in FIG. 3 and FIG. 4, and therefore a state is achieved wherein the abutting sections 16 abut against the respective abutting sections 17 directly from the rear direction, and hence the pushing movement is achieved in a smooth and reliable manner.

Furthermore, in the left (or right-hand) curved path section 5b, the respective frame members 12, 13, 14 are pushed from behind and moved in a bent attitude following the curve of the path, in plan view, in the regions of the connecting devices 20. Thereby, in plan view, the relative angle formed between the rear frame member 14 of the leading movable body 10 and the front frame member 12 of the following movable body 10 is an obtuse angle, and since the abutting section 16 meets the abutting section 17 at an obtuse angle, the pushing movement can be performed smoothly and reliably.

Here, the curving is performed by relative rotation about the vertical axle 21 at the connecting device 20. Moreover, by means of the guided devices 30, 40 rotating about vertical axes 21a, 25a by means of the vertical axles 21, 25, the guided devices 30, 40 can be moved smoothly whilst the orientation thereof changes automatically in accordance with the leftward or rightward curvature of the main rail 2, 2A.

Next, a second embodiment of the present invention is described on the basis of FIG. 21 to FIG. 24. More specifically, branching means 121 comprises two divided rail members 122A, 122B capable of supporting the guided devices 30, 40, formed by dividing the main rail 2 at a prescribed region 5d, and rotating devices 131A, 131B which cause these divided rail members 122A, 122B to rotate about vertical axes 123A, 123B. The divided rail members 122A, 122B are constituted in such a manner that when rotated and separated from the main rail 2, they can be connected to lateral travel rail members 80A, 80B.

In order to rotate the two divided rail members 122A, 122B about the vertical axes 123A, 123B, bearings 125A, 125B are provided on beams 124A, 124B, and the divided rail members 122A, 122B are connected to the lower end of vertical axles 126A, 126B supported rotatably on the bearings 125A, 125B.

The rotating devices 131A, 131B which cause the divided rail members 122A, 122B to rotate about the vertical axes 123A, 123B are provided singly for each of the divided rail members 122A, 122B. In other words, links 132A, 132B are fixed to the upper ends of the vertical axles 126A, 126B, and cylinder devices 133A, 133B are provided between one end of the links 132A, 132B and the beams 124A, 124B. Furthermore, pairs of stopper members 134A, 134B, 135A, 135B which are capable of abutting on the other ends of the links 132A, 132B are provided on the beams 124A, 124B.

Feeding means (not illustrated) capable of acting on the guided devices 30, 40 are provided respectively in the region of the branching means 121, in a state where they oppose the divided rail members 122A, 122B when connected to the lateral travel rail members 80A, 80B.

Below, the operation of the second embodiment described above will be described.

Figure 21:
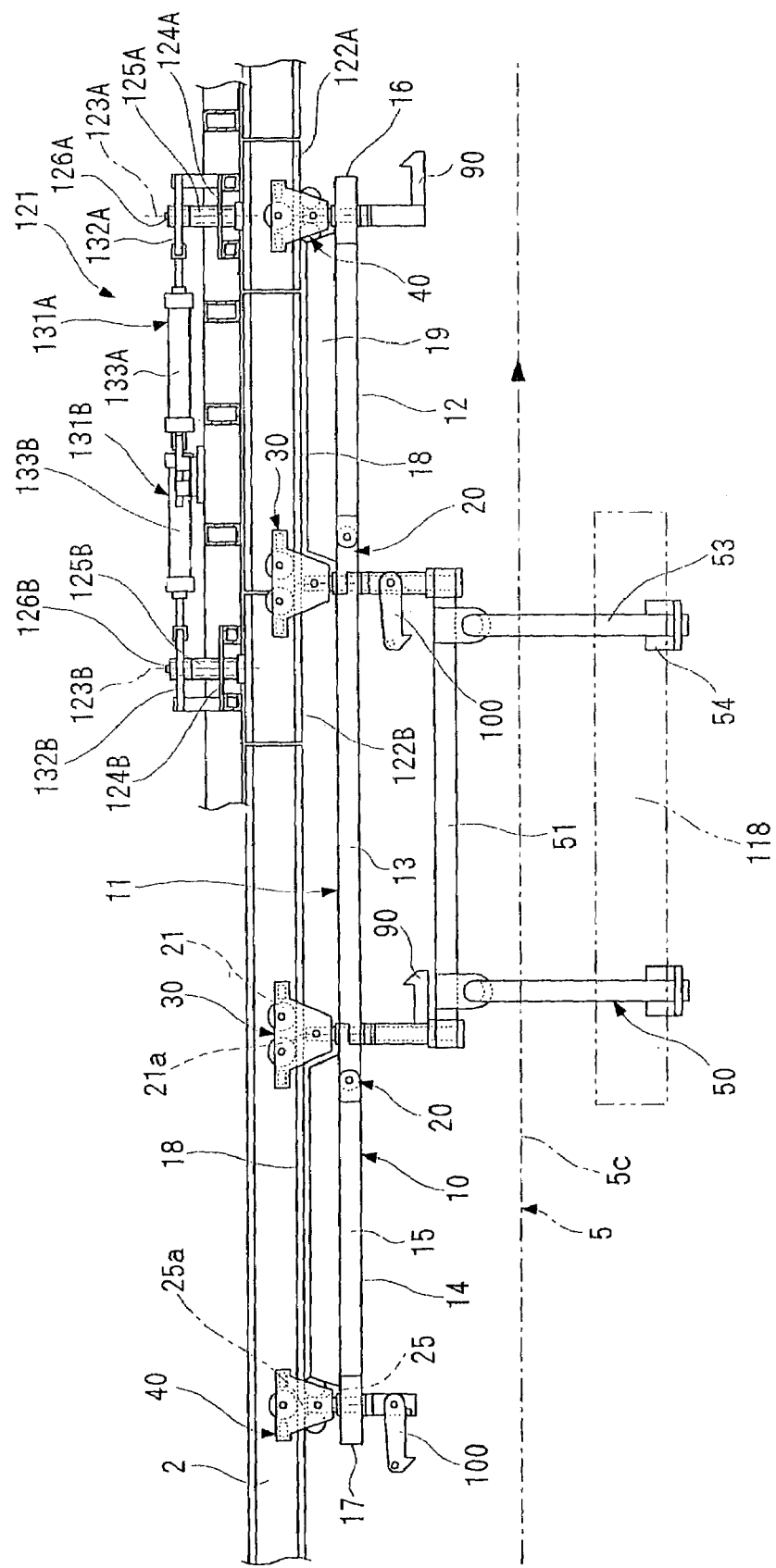
FIG. 21 is a side view of a conveyance apparatus using movable bodies, before branching is started, according to a second embodiment of the present invention.
Figure 22:
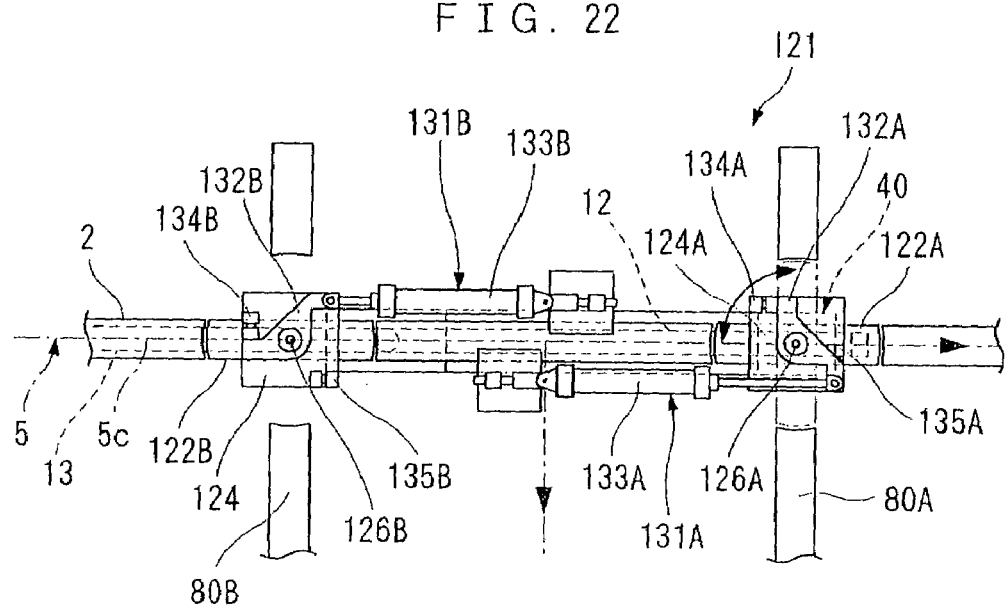
FIG. 22 is a partially cutaway plan view of the conveyance apparatus using movable bodies, before branching is started.

In the prescribed region 5*d*, the upstream end and downstream end of the divided rail members 122A, 122B are connected to the main rail 2, as illustrated in FIG. 21 and FIG. 22. Thereby, the divided rail members 122A, 122B are disposed in an integral, linear fashion with respect to the main rail 2. Consequently, when there is no requirement to branch off a movable body 10 into the working path section 6, the movable body 10 is caused to move and pass through the prescribed region 5*d*, with the divided rail members 122A, 122B being in this mentioned state.

Furthermore, if a movable body 10 is to be branched off into the working path section 6, then firstly, as illustrated by the solid lines in FIG. 22, the movable body 10 is halted at a position where the leading end guided device 40 of the movable body 10 is supported by the lower side divided rail member 122A. Next, the vertical axle 126A is caused to rotate through 90°, via the link 132A and the like, by means of a compressive movement of the cylinder device 133A in the rotating device 131A. By this rotational movement, the divided rail member 122A is separated from the main rail 2, and is then connected to the lateral travel rail member 80A, as illustrated by the dotted lines in FIG. 22.

By means of the feeding means acting on the leading end guided device 40, this end guided device 40 is caused to move from the divided rail member 122A onto the lateral travel rail member 80A. In this case, by detecting the movement of the end guided device 40 onto the lateral travel rail member 80A, the vertical axle 126A is rotated in reverse via the link 132A, and the like, by means of a reverse operation of the cylinder device 133A, thereby connecting the divided rail member 122A to the main rail 2.

Figure 23:
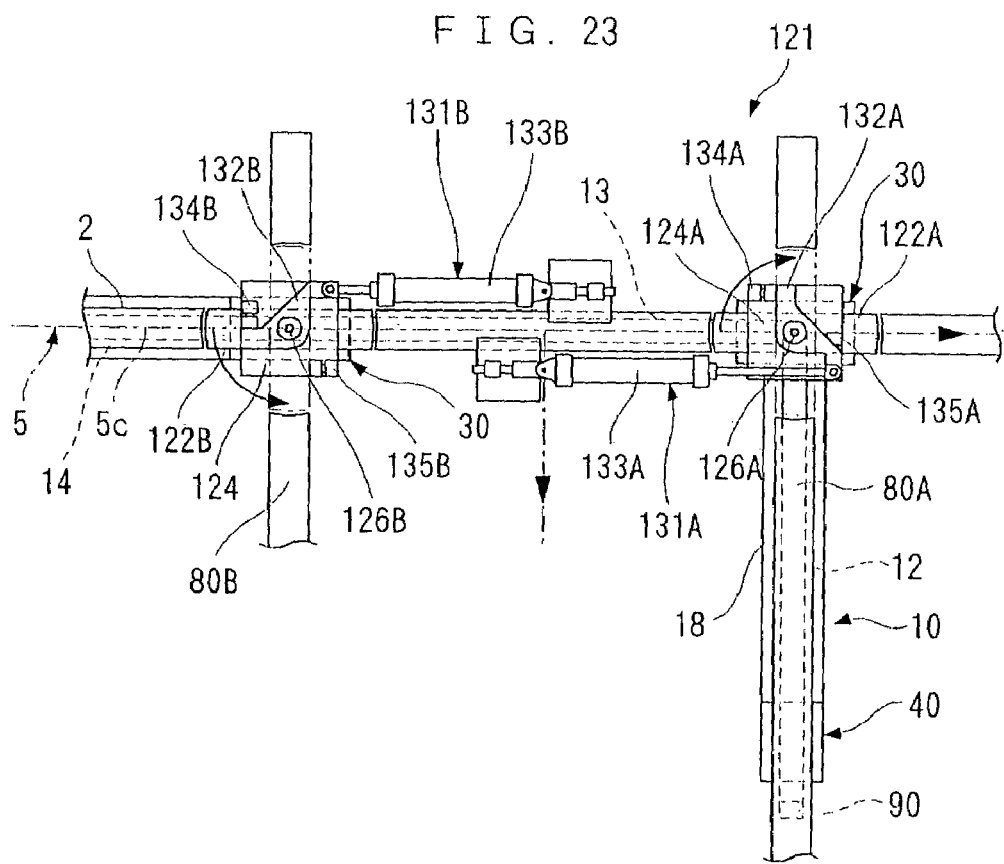
FIG. 23 is a partially cutaway plan view of the conveyance apparatus using movable bodies, during branching.

In this state, as indicated by the solid lines in FIG. 23, the movable body 10 is then halted at a position where the leading middle guided device 30 is supported by the divided rail member 122A and the trailing middle guided device 30 is supported by the upper side divided rail member 122B. Next, by extension and/or contraction of the cylinder devices 133A, 133B in the rotating devices 131A, 131B, the vertical axles 126A, 126B are caused to rotate through 90°, via the links 132A, 132B, and the like. By means of this rotation, the divided rail members 122A, 122B are separated from the main rail 2 and, as shown by the dotted lines in FIG. 23, and are connected with the lateral travel rail members 80A, 80B.

By means of the feeding means acting on the two middle guided devices 30, these middle guided devices 30 are caused to move from the divided rail members 122A, 122B onto the lateral travel rail members 80A, 80B. In this case, by detecting the movement of the middle guided device 30 onto the lateral travel rail members 80A, 80B, the vertical axles 126A, 126B are rotated in reverse by a reverse operation of the cylinder devices 133A, 133B, via the links 132A, 132B, and the like, whereby the divided rail members 122A, 122B are connected to the main rail 2. In this state, the rear side end guided device 40 is moved via the divided rail member 122B and onto the lateral travel rail member 80B, by a similar action to the foregoing.

Figure 24:
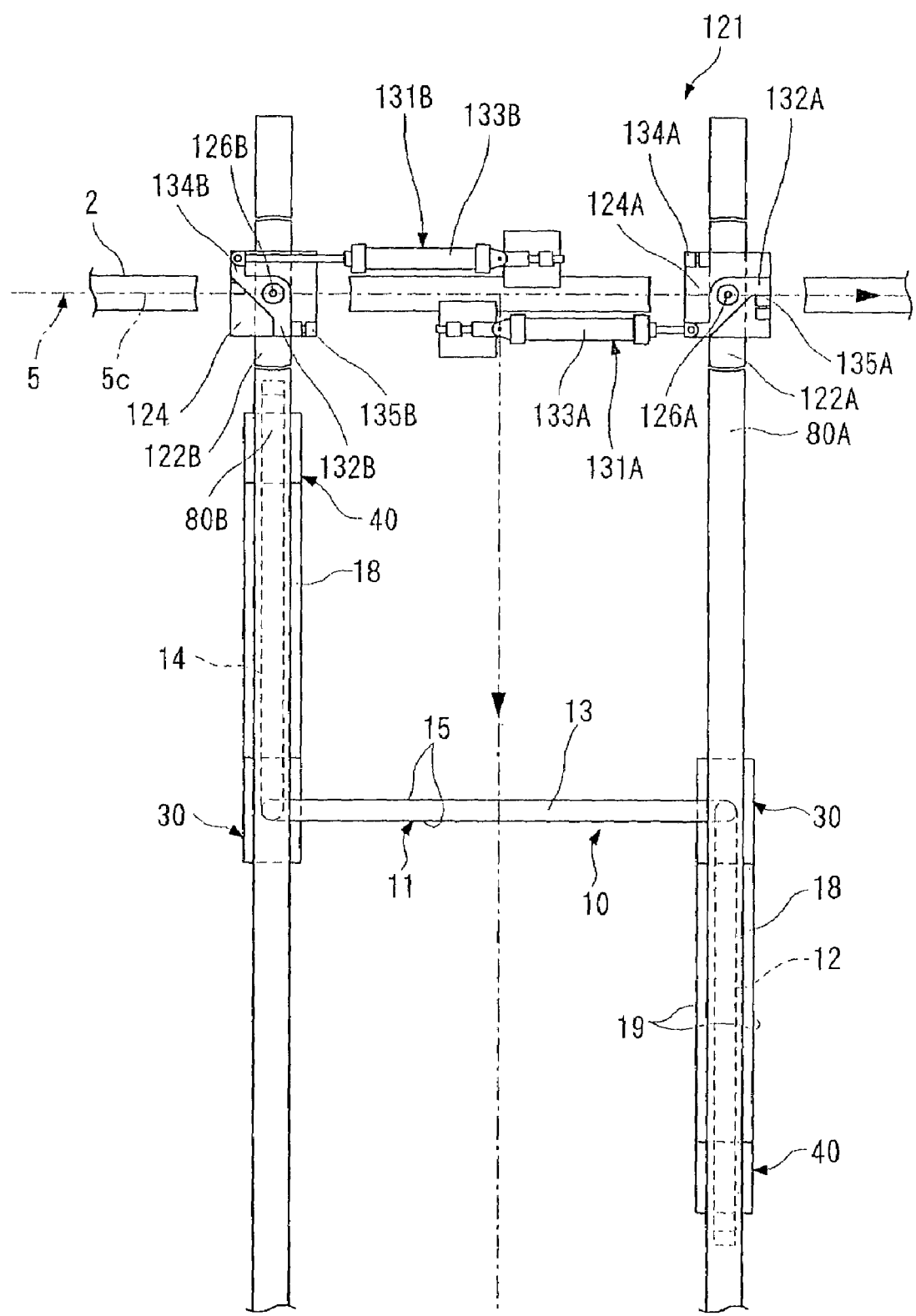
FIG. 24 is a partially cutaway plan view of the conveyance apparatus using movable bodies, when branching is finished.

In this way, as illustrated in FIG. 24, the movable body 10 can be branched off into the working path section 6 in a state wherein the front frame member 12 thereof is aligned with one of the lateral travel rail members 80A, the middle frame member 13 fitted with the supporting section 50 assumes an orthogonal attitude with respect to the direction of travel, and furthermore, the rear frame member 14 is bent in the opposite direction so as to be aligned with the other lateral travel rail member 80B. The divided rail members 122A, 122B are rotated back appropriately in such a manner that the downstream ends thereof connect with the main rail 2.

Next, a third embodiment of the present invention will be described on the basis of FIG. 25 and FIG. 26.

In this third embodiment, a configuration of lateral travelling is achieved wherein a movable body 10 does not pass through the prescribed region 5*d* when it reaches it, but rather is always moved onto a working path section 6. More specifically, as illustrated in FIG. 25, the branching means 140 is provided in one place, commonly for both the lateral travel rail members 80A, 80B, and it comprises a rail member 141 which connects to the final end of the main rail 2, and an operating device (cylinder device, or the like) 143 for causing this rail member 141 to rotate about the axis of a vertical axle 142. A composition is adopted wherein when the rail member 141 is rotated, the upstream end thereof remains connected to the main rail 2 at all times, and the downstream end thereof connects selectively with one of the two lateral travel rail members 80A, 80B.

Figure 26:
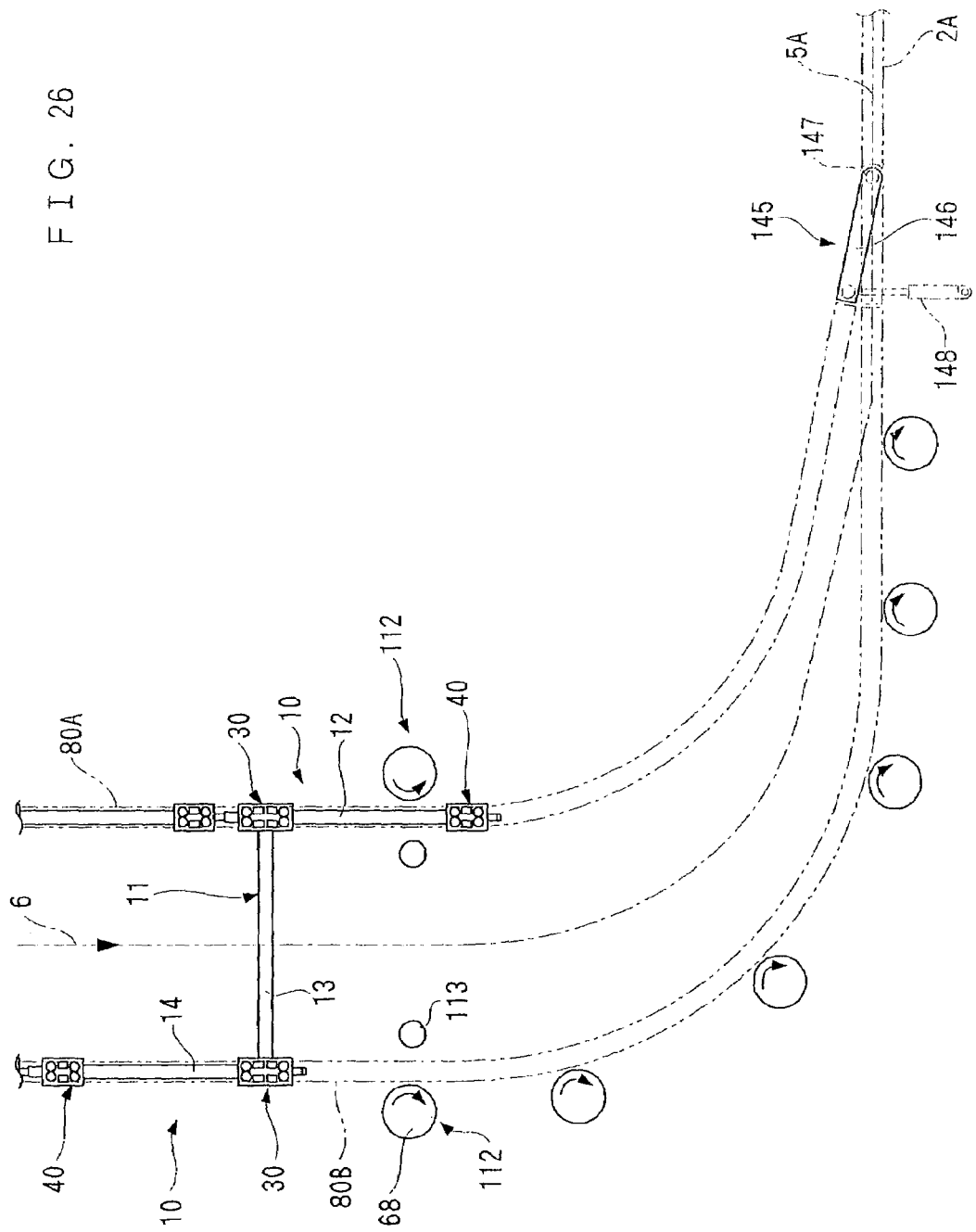
FIG. 26 is a schematic plan view of a joining means section in the conveyance apparatus using movable bodies.

As illustrated in FIG. 26, the joining means 145 has a similar composition to the branching means 140, and it comprises a rail member 146 connected to the start end of the main rail 2A, an operational device 148 for causing this rail member 146 to rotate about the axis of the vertical axle 147, and the like, and the joining means 145 is disposed in a symmetrical position with respect to the branching means 140.

Below, the operation of the third embodiment described above will be described.

Figure 25:
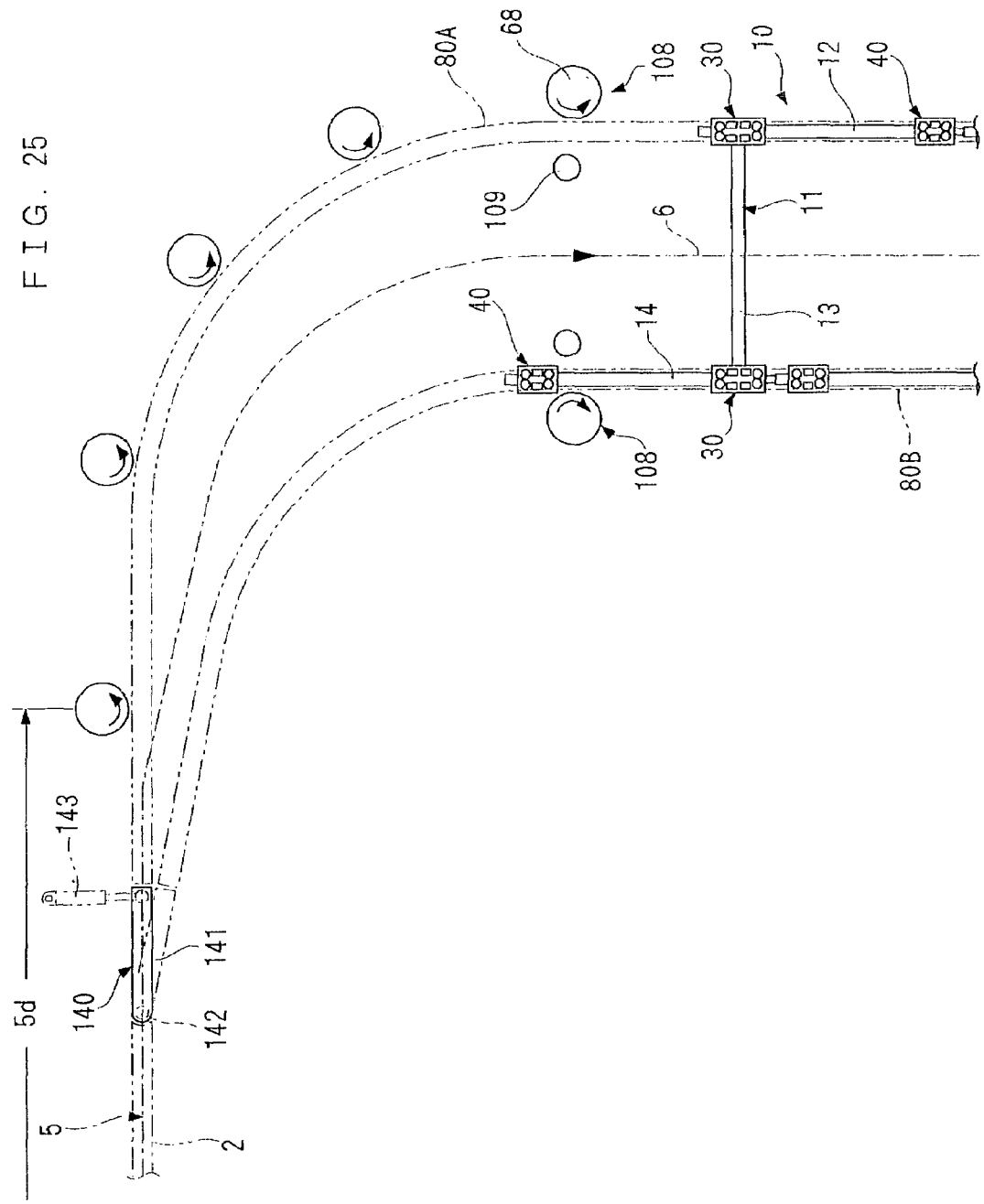
FIG. 25 is a schematic plan view of a branching means section in a conveyance apparatus using movable bodies, according to a third embodiment of the present invention.

When a movable body 10 is moved into the working path section 6, firstly, as illustrated by the solid lines in FIG. 25, the operating device 143 of the branching means 140 is actuated, causing the rail member 141 to turn about the vertical axle 142, such that the downstream end thereof connects with the lateral travel rail member 80A. Thereby, the leading end guided device 40 and the front side middle guided device 30 of the movable body 10 move from the rail member 141 onto the lateral travel rail member 80A.

By detecting that the front side middle guided device 30 has passed over the rail member 141, the operating device 143 in the branching means 140 is actuated, causing the rail member 141 to rotate about the vertical axle 142, such that the downstream end thereof connects with the lateral travel rail member 80B, as illustrated by the dotted lines in FIG. 25. Thereby, the rear side middle guided device 30 and the trailing end guided device 40 move via the rail member 141 onto the lateral travel rail member 80B.

By operating the rail member 141 of the branching means 140 to perform a branching operation in this way, it is possible to cause the movable body 10 to move laterally onto the working path section 6, in a state where the front frame member 12 is aligned with one of the lateral travel rail members 80A, in a preceding fashion, the middle frame member 13 fitted with the supporting section 50 is positioned orthogonally with respect to the direction of travel, and furthermore, the rear frame member 14 is bent in the opposite direction so as to be aligned with the other lateral travel rail member 80B, in a trailing fashion.

When the movable body 10 on the working path section 6 moves onto the fixed path 5A, firstly, as shown by the solid lines in FIG. 26, the operating device 147 in the joining means 145 is caused to extend, thereby rotating the rail member 146 about the vertical axle 147, such that the upstream end thereof connects with the lateral travel rail member 80A. Thereby, the leading end guided device 40 and the front side middle guided device 30 of the movable body 10 move from the lateral travel rail member 80A onto the main rail 2A, via the rail member 146.

By detecting the passage of the front side middle guided device 30 over the rail member 146, the operating device 147 in the joining means 145 is contracted, thereby rotating the rail member 146 about the vertical axle 147, such that the upstream end thereof connects with the lateral travel rail member 80B, as illustrated by the dotted lines in FIG. 26. Thereby, the rear side middle guided device 30 and the trailing end guided device 40 move from the lateral travel rail member 80B, via the rail member 146, and onto the main rail 2A.

Next, a fourth embodiment of the present invention will be described with reference to FIG. 27 to FIG. 30.

In this fourth embodiment, a configuration is adopted wherein the movable body 10 is branched off into the working path section 6 in a U-shaped bent attitude, whereby the front frame member 12 and the rear frame member 14 are aligned with the lateral travel rail members 80A, 80B, in a preceding fashion, and the middle frame member 13 is caused to assume an orthogonal position with respect to the direction of travel, in a trailing fashion.

In other words, the branching means 151 constitutes a divided rail member 152A, which is able to support the leading end guided device 40 and the front side middle guided device 30 simultaneously, a divided rail member 152B, which is able to support the rear side middle guided device 30 and the trailing end guided device 40 simultaneously, formed by dividing the main rail 2 at a prescribed region 5d, and rotating devices 161A, 161B which cause these divided rail members 152A, 152B to rotate about vertical axes 153A, 153B. When rotated and separated from the main rail 2, the divided rail members 152A, 152B are able to connect with lateral travel rail members 80A, 80B.

In order that the two divided rail members 152A, 152B can rotate about the vertical axes 153A, 153B, bearings 155A, 155B are provided in beams 154A, 154B, and the divided rail members 152A, 152B are coupled to the lower ends of vertical axles 156A, 156B which are supported rotatably in these bearings 155A, 155B. Here, the vertical axles 156A, 156B are positioned on mutually adjacent sides.

Rotating devices 161A, 161B which cause the divided rail members 152A, 152B to rotate about the vertical axes 153A, 153B are provided, one for each of the divided rail members 152A, 152B. More specifically, links 162A, 162B are fixed to the upper ends of the vertical axles 156A, 156B, and cylinder devices 163A, 163B are provided between one end of the links 162A, 162B and the beams 154A, 154B.

Furthermore, arc-shaped guide rails 164A, 164B having respective centres of curvature at the vertical axes 153A, 153B, are provided on the beams 154A, 154B, and guide rollers 158A, 158B installed on the upper portion of the free ends of the divided rail members 152A, 152B via brackets 157A, 157B are supported and guided by these guide rails 164A, 164B. Moreover, pairs of stopper members 165A, 165B, 166A, 166B which are capable of abutting on the brackets 157A, 157B are provided on the beams 154A, 154B.

Delivery means (not illustrated) capable of acting on the guided devices 30, 40 are provided respectively in the region of the branching means 151, in such a manner that they oppose the two divided rail members 152A, 152B when connected to the lateral travel rail members 80A, 80B.

Below, the operation of the fourth embodiment described above will be explained.

Figure 27:
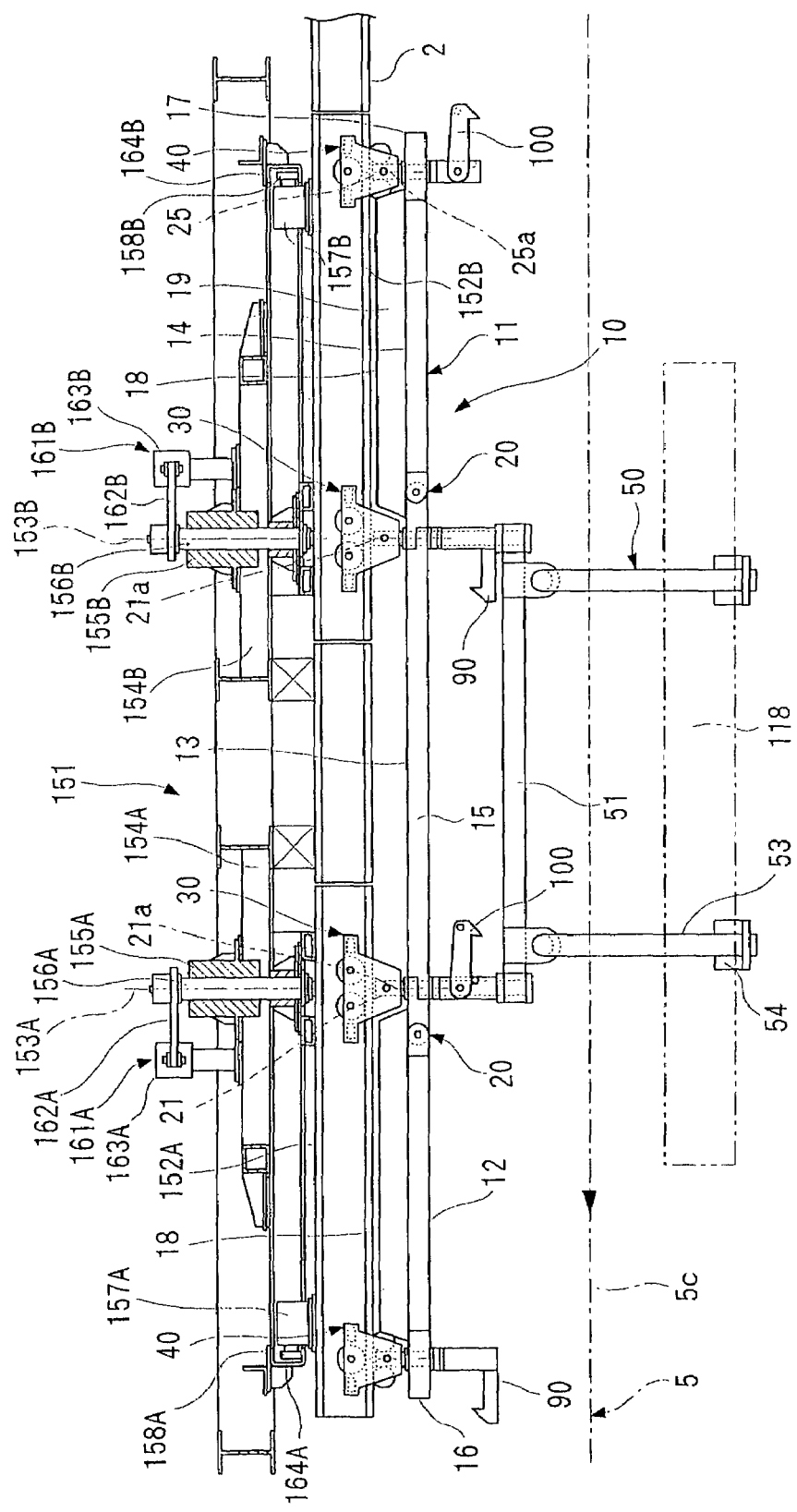
FIG. 27 is a partially cutaway side view of a branching means section in a conveyance apparatus using movable bodies, before branching is started, according to a fourth embodiment of the present invention.
Figure 28:
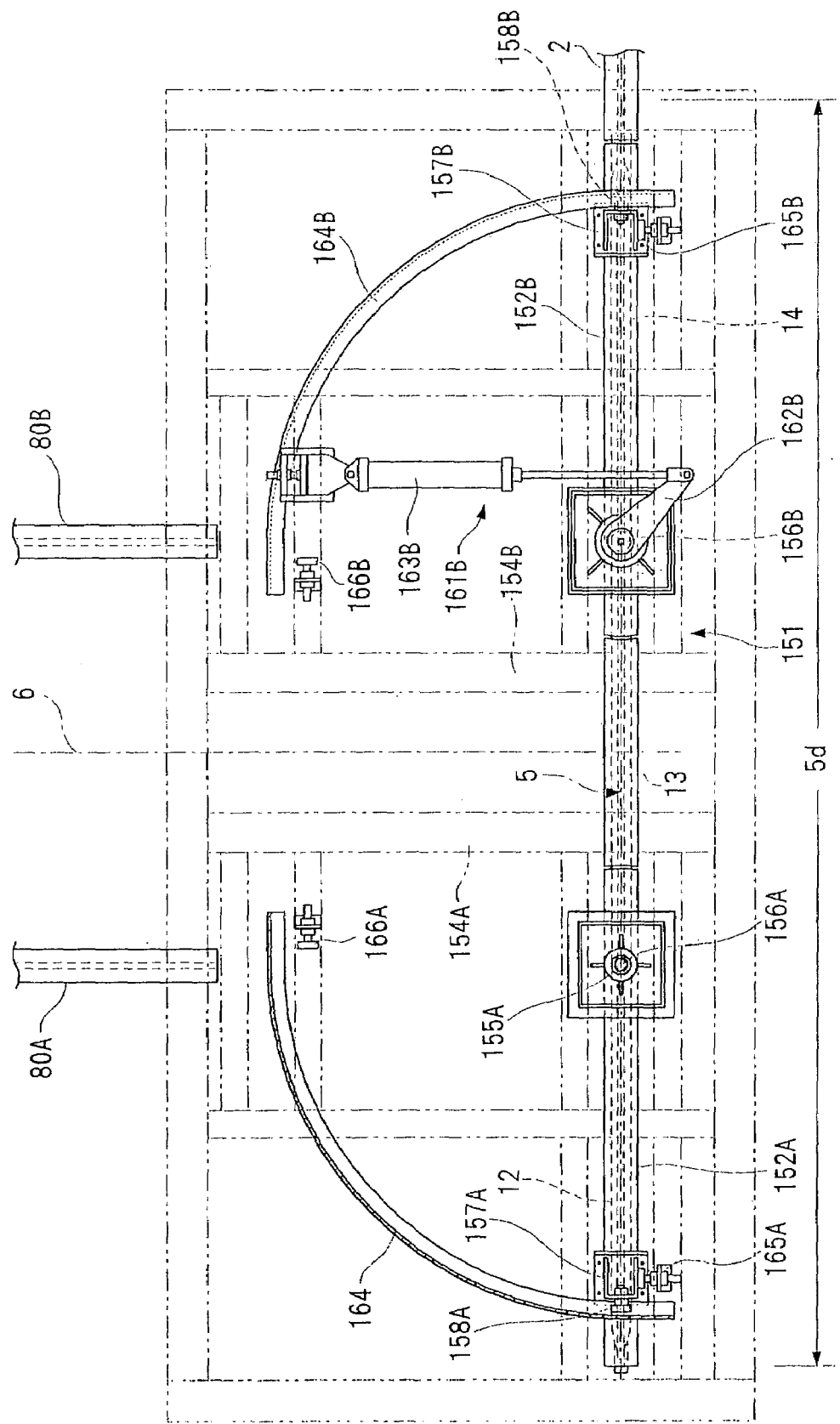
FIG. 28 is a partially cutaway plan view of the branching means section in the conveyance apparatus using movable bodies, before branching is started.

In the prescribed region 5d, the divided rail members 152A, 152B are connected to the main rail 2, as illustrated in FIG. 27 and FIG. 28. Accordingly, the divided rail members 152A, 152B are disposed in an integral and linear fashion with respect to the main rail 2.

When a movable body 10 is to be branched off into the working path section 6, firstly, the movable body 10 is halted at a position where the leading end guided device 40 and the front side middle guided device 30 of the movable body 10 are supported simultaneously by the lower side divided rail member 152A, whilst the rear side middle guided device 30 and the trailing end guided device 40 are supported simultaneously by the upper side divided rail member 152B.

Figure 29:
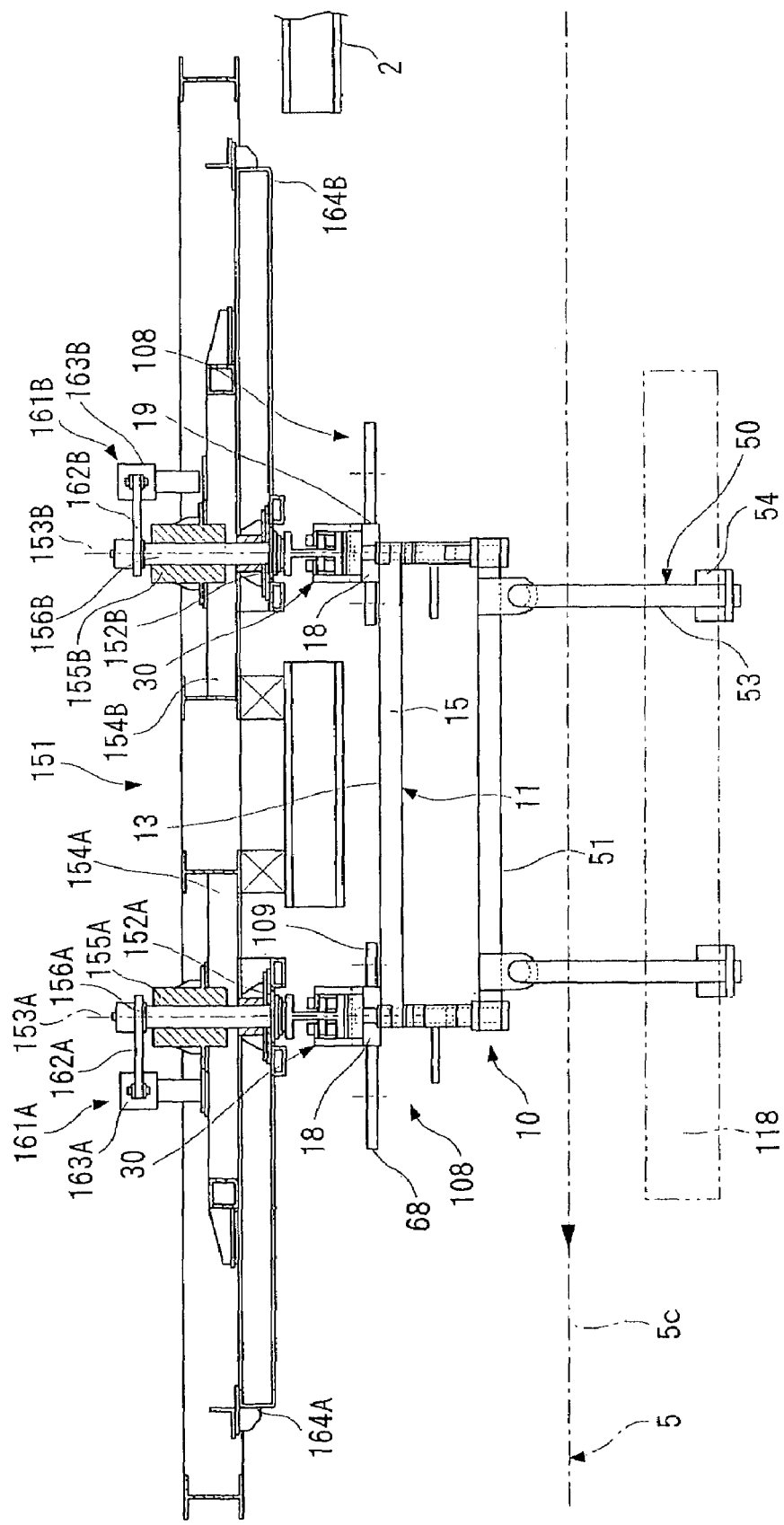
FIG. 29 is a partially cutaway side view of the branching means section in the conveyance apparatus using movable bodies, during branching.
Figure 30:
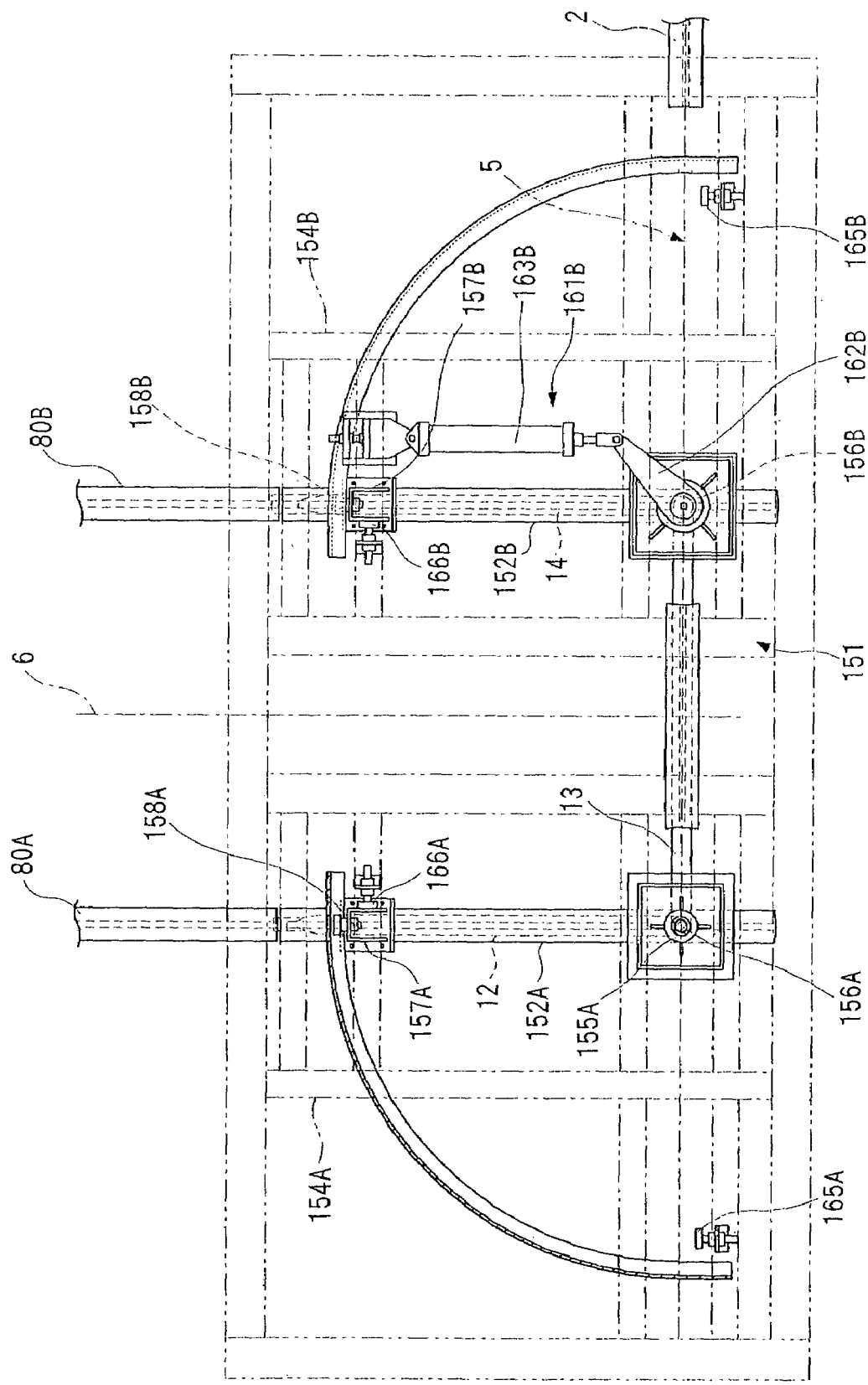
FIG. 30 is a partially cutaway plan view of the branching means section in the conveyance apparatus using movable bodies, during branching.

Thereupon, by the contraction of the cylinder device 163A, 163B in the rotating devices 161A, 161B, the vertical axles 156A, 156B are caused to rotate through 90°, via the links 162A, 162B, and the like. By means of this rotation, the divided rail members 152A, 152B are separated from the main rails 2, and they connect with the lateral travel rail members 80A, 80B, as illustrated in FIG. 29 and FIG. 30.

By causing the feeding means to act on the respective end guided devices 40 and the respective middle guided devices 30, the end guided devices 40 and the middle guided devices 30 are caused to move from the divided rail members 152A, 152B onto the lateral travel rail members 80A, 80B. In this case, by detecting the movement of the middle guided devices 30 onto the lateral travel rail members 80A, 80B, the vertical axles 156A, 156B are rotated in reverse by actuation of the cylinder devices 163A, 163B, via the links 162A, 162B, and the like, thereby causing the divided rail members 152A, 152B to rotate back so as to connect with the main rail 2.

Thereby, it is possible to cause a movable body 10 to branch off into the working path section 6 in a U-shaped bent attitude, wherein the front frame member 12 and the rear frame member 14 are aligned with the lateral travel rail members 80A, 80B, in a preceding fashion, and the middle frame member 13 fitted with the supporting section 50 is caused to assume an orthogonal position with respect to the direction of travel, in a trailing fashion.

Figure 31:
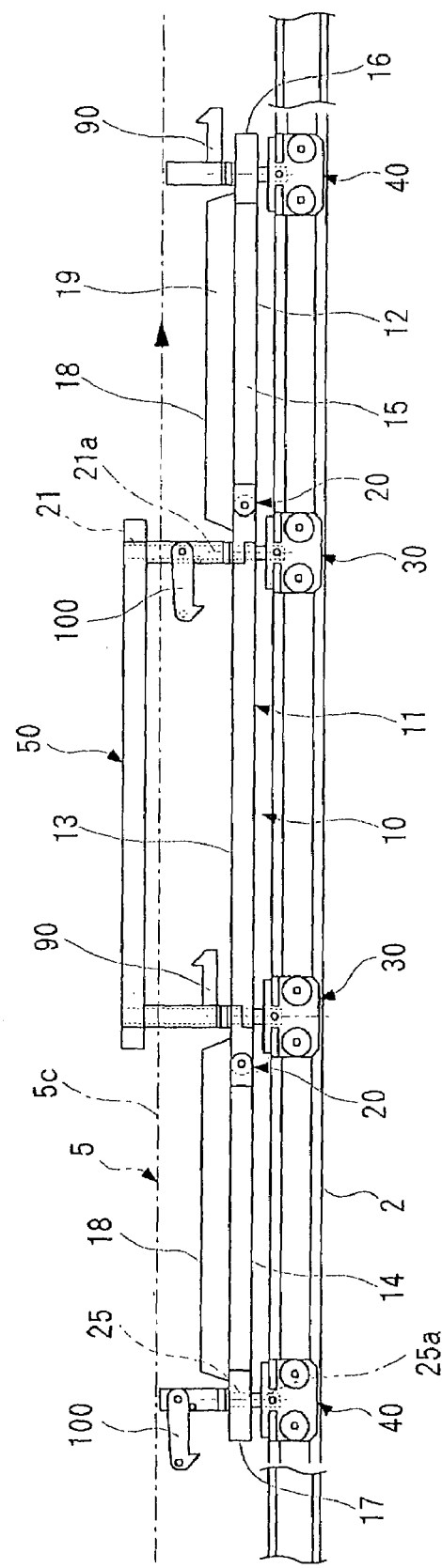
FIG. 31 is a side view of a conveyance apparatus using movable bodies, according to a fifth embodiment of the present invention.

Next, a fifth embodiment of the present invention, in other words, an embodiment involving movable bodies 10 capable of moving along the floor, is described on the basis of FIG. 31. In the fifth embodiment, the main rail 2 and the divided rail members 82A, 82B, and the like, have broadly the same composition as those of the first embodiment described above, although they differ in terms of detailed composition, such as the format of left and right-hand pairings, and the like. Consequently, constituent elements which are the same as or similar to elements in the first embodiment described above are labelled with the same reference numerals and detailed description thereof is omitted.

The respective embodiments described above related to a configuration wherein a prescribed region 5d is formed at one location of a linear shaped path section 5c, but it is also possible to adopt a configuration wherein prescribed regions 5d are formed at a plurality of locations in the linear shaped path section 5c, lateral travel rail members 80A, 80B being provided to correspond with each of the prescribed regions 5d.

In the first embodiment described above, the movable body 10 is branched off onto the working path section 6 in a state where the front frame member 12 is aligned with one of the lateral travel rail members 80A, in a preceding fashion, a middle frame member 13 is positioned orthogonally with respect to the direction of travel, and the rear frame member 14 is bent in the opposite direction so as to be aligned with the other lateral travel rail member 80B, but by adjusting the operation of the branching means 81, 121, it is also possible to branch off the movable body 10 to the working path section 6 in a U-shaped bent state, wherein the front frame member 12 and the rear frame member 14 are aligned with the lateral travel rail members 80A, 80B, in a preceding fashion, and the middle frame member 13 is caused to assume an orthogonal position with respect to the direction of travel, in a trailing fashion, and it is also possible to branch off the movable body 10 to the working path section 6 in an inverse U-shaped bent state, wherein the middle frame member 13 is caused to assume an orthogonal position with respect to the direction of travel, in a preceding fashion, and the front frame member 12 and the rear frame member 14 become aligned with the lateral travel rail members 80A, 80B, in a trailing fashion.

In the respective embodiments described above, configurations are described wherein the movable body 10 is moved laterally in the working path section 6 in a state where a single middle frame member 13 is positioned orthogonally with respect to the direction of travel, but it is also possible to adopt a configuration wherein two or more middle frame members 13 provided with respective supporting sections 50 are moved laterally in the working path section 6 in an orthogonal position with respect to the direction of travel, and in this case, three or more lateral travel rail members are to be provided.

In the respective embodiments described above, the middle guided devices 30 are coupled in a relatively rotatable manner to the end of vertical axles 21 which are connected in a relatively rotatable manner in the crosswise direction, to the frame members 12, 13, 14, but it is also possible, for example, to adopt a configuration wherein the middle guided devices 30 are coupled in a relatively rotatable manner via vertical axles provided independently on the middle frame member 13.

In the respective embodiments described above, a composition was described wherein the main body 11 of the movable body 10 consisted of three frame members 12, 13 14, but it is also possible to adopt a composition of three or more members, wherein a single frame member or a plurality of frame members are connected before or after the front frame member 12, or before or after the rear frame member 14, or a composition of three or more members having a plurality of middle frame members 13. Furthermore, a two member composition can be adopted wherein any one of the frame members 12, 13, 14 is omitted. In these cases, the number and positions, and the like, of the lateral travel rail members 80A, 80B are designed and changed in accordance with the number and length, and the like, of the frame members.

In the respective embodiments described above, a composition was described wherein a connecting device 20 is achieved by providing a vertical axle 21 on the middle frame member 13 and providing a horizontal axle 23 on the front and rear frame members 12, 14, but it is also possible to adopt a composition wherein horizontal axles are provided on the middle frame member 13, and vertical axles are provided on the front and rear frame members 12, 14.

In the respective embodiments described above, a drive configuration is adopted wherein a plurality of movable bodies 10 are conveyed between feeding means 60 and braking means 75 in an aligned state whilst being pushed tightly from behind, without gaps occurring between the respective front and rear ends thereof, but it is also possible to adopt a configuration wherein the movable bodies 10 are conveyed and driven in a state where gaps occur between the respective front and rear ends thereof.

Figure 5:
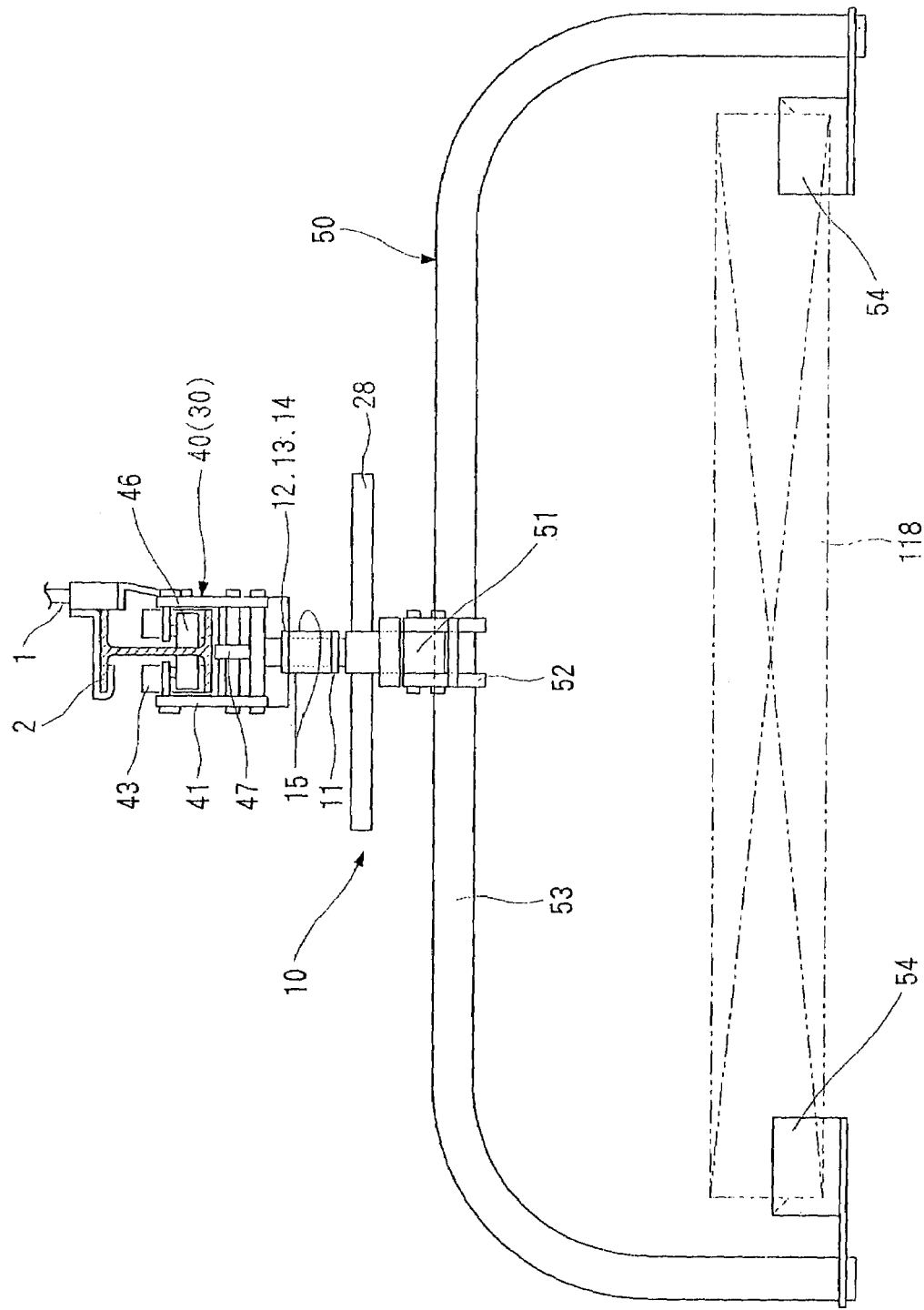
FIG. 5 is a rear view of the movable body in the linear path section of the conveyance apparatus using movable bodies.

In the respective embodiments described above, a configuration was adopted wherein the movable bodies 10 are moved by means of the feed rollers 68 of feeding means 60, 78, 79 abutting on the passive surfaces 15, but it is also possible to move the movable bodies 10 by means of a drive chain mechanism, in the prescribed region 5d, in particular, or the like. More specifically, as shown in FIG. 5, it is also possible to adopt a configuration wherein a drive transmission member on a drive chain provided in the direction of the linear path section 5c engages with and disengages from a receiving pin 28 provided on the middle frame member 13. Furthermore, a system wherein a drive belt abuts against the passive surfaces 15 may also be adopted.

In the respective embodiments described above, a configuration is described wherein feeding means 60, 78, 79, braking means 75, and the like, act only on any one of the passive surfaces 15 of the main body 11, but it is also possible to adopt a configuration wherein, by providing receiving means, such as a receiving roller which acts on another passive surface, or the like, a strong frictional force can be obtained by gripping the main body 11 from both sides, and hence a sufficient conveying force and braking force can be exerted. In this case, it is also possible for the receiving roller acting on the other passive surfaces to be a forcibly driven type of roller or a freely rotating roller.

In the respective embodiments described above, it is also possible to adopt a working path section 6 having a descending path section and an ascending path section, by displacing the lateral travel rail members 80A, 80B in an upper and lower configuration.

What is claimed is:

1. A conveyance apparatus using movable bodies, each movable body movable along a fixed path by a plurality of guided devices, said guided devices supporting and guiding said movable body on a main rail, each movable body having a main body comprising a front frame member having a front end, a rear frame member having a rear end and a middle frame member having a front end and a rear end, and said main body further comprising connecting devices for connecting the frame members in a relatively rotatable fashion in a transverse direction with respect to a longitudinal direction, a supporting section provided on said middle frame member for conveyed items, and vehicle axles coupling, in a relatively rotatable fashion, each of said guided devices to the movable body, wherein said guided devices comprise middle guided devices provided on the respective front and rear ends of the middle frame member, and end guide devices provided on said front end of the front frame member and on said rear end of the rear frame member, said conveyance apparatus further comprising:

a plurality of lateral travel rail members on a lateral side of a prescribed region of the fixed path, said travel rail members supporting and guiding the guided devices wherein said middle frame member provided with the supporting section assumes an orthogonal position with respect to a direction of travel, and the other frame members align with the direction of travel; and branching means in the prescribed region for causing the guided devices on the main rail to branch off onto the plurality of lateral travel rail members, said branching means allowing the frame members other than said middle frame member provided with the supporting section to assume an orthogonal attitude in a same direction, with respect to said middle frame member provided with the supporting section, wherein said branching means comprises a divided rail member simultaneously supporting the end guided device on the front frame member and the middle guided device at the front, a divided rail member simultaneously supporting the middle guided device at the rear and the end guided device on the rear frame member, said respective divided rail members being formed by dividing the main rail in the prescribed region, and rotating devices for causing said divided rail members to rotate about vertical axes, and wherein said lateral travel rail members are arranged in a pair and allow the divided rail members to connect thereto when the divided rail members have been rotated and separated from the main rail.

2. The conveyance apparatus using movable bodies according to claim 1, wherein:

said movable body is capable of branching off into a working path section in a U-shaped bent attitude, wherein the front frame member and the rear frame member are aligned with the lateral travel rail members, in a preceding fashion, and the middle frame member fitted with the supporting section is caused to assume an orthogonal position with respect to the direction of travel, in a trailing fashion.

3. The conveyance apparatus using movable bodies according to claim 1, wherein:

said movable body is caused to branch off to a working path section in an inverse U-shaped bent state, wherein the middle frame member is caused to assume an orthogonal position with respect to the direction of travel, in a preceding fashion, and the front frame member and the rear frame member are aligned with the lateral travel rail members, in a trailing fashion.

* * * * *